(12) United States Patent
Okawa et al.

(10) Patent No.: US 7,295,402 B2
(45) Date of Patent: Nov. 13, 2007

(54) MAGNETIC TAPE CARTRIDGE AND RECORDER/REPRODUCER A MAGNETIC TAPE CARTRIDGE

(75) Inventors: Wataru Okawa, Miyagi (JP); Minoru Yamaga, Miyagi (JP); Katsunori Maeshima, Miyagi (JP); Noriyuki Hirai, Miyagi (JP); Satoshi Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/502,608

(22) PCT Filed: Jan. 20, 2003

(86) PCT No.: PCT/JP03/00434

§ 371 (c)(1),
(2), (4) Date: Jul. 26, 2004

(87) PCT Pub. No.: WO03/065373

PCT Pub. Date: Aug. 7, 2003

(65) Prior Publication Data

US 2005/0105210 A1 May 19, 2005

(30) Foreign Application Priority Data

Jan. 28, 2002 (JP) ............................. 2002-019246

(51) Int. Cl.
*G11B 5/00* (2006.01)

(52) U.S. Cl. .................... 360/130.21; 360/90
(58) Field of Classification Search .............. 360/132; 242/348

See application file for complete search history.

(56) References Cited

U.S. PATENT DOCUMENTS

| 4,345,284 A | * | 8/1982 | Saito | .......................... 360/132 |
| 4,578,725 A | * | 3/1986 | Muller | ........................ 360/85 |
| 4,712,148 A | * | 12/1987 | Balz et al. | .................. 242/346 |
| 4,864,351 A | * | 9/1989 | Imai et al. | .................. 399/142 |
| 5,326,635 A | * | 7/1994 | Koyama | ..................... 428/323 |

(Continued)

FOREIGN PATENT DOCUMENTS

JP      55 141381      10/1980

(Continued)

OTHER PUBLICATIONS

Translation of abstract JP- Publication No. 02257425, Oct. 18, 1990.*

(Continued)

*Primary Examiner*—Wayne Young
*Assistant Examiner*—Linh T. Nguyen
(74) *Attorney, Agent, or Firm*—Frommer Lawrence & Haug LLP; William S. Frommer; Paul A. Levy

(57) ABSTRACT

A magnetic tape cartridge and A magnetic tape cartridge recording/reproducing apparatus, which can prevent a magnetic tape from being charged to avoid damage of a magnetic head while lowering the resistance of the magnetic tape and maintaining optimum electromagnetic conversion properties. A tape reel (7) is formed from a conductive material, and one end portion of a magnetic tape (6) connected to a reel hub (7B) has a surface resistivity [Ω/sq] in the order of $10^7$ or less. In the magnetic tape (6) having a multilayer structure which comprises a magnetic layer (23), a nonmagnetic conductor layer (22), a plastic film (21), and a back coat layer (24) from the magnetic surface (6M) side, even when the surface resistivity of the magnetic layer (23) exceeds $10^7$ Ω/sq, the magnetic layer (23) is removed and the exposed nonmagnetic conductor layer (22) is connected to the reel hub (7A), thus lowering the resistance of the magnetic tape while maintaining optimum electromagnetic conversion properties.

12 Claims, 13 Drawing Sheets

U.S. PATENT DOCUMENTS

| | | | | |
|---|---|---|---|---|
| 5,479,311 A | * | 12/1995 | Doushita et al. | 360/132 |
| 2002/0089780 A1 | * | 7/2002 | Soda et al. | 360/96.3 |
| 2002/0105752 A1 | * | 8/2002 | Soda et al. | 360/90 |

FOREIGN PATENT DOCUMENTS

| | | | |
|---|---|---|---|
| JP | 56 47967 | | 4/1981 |
| JP | 60 70519 | | 4/1985 |
| JP | 61-165765 | | 7/1986 |
| JP | 61165765 A | * | 7/1986 |
| JP | 2-162586 | | 6/1990 |
| JP | 2-257425 | | 10/1990 |
| JP | 02257425 A | * | 10/1990 |
| JP | 4 111073 | | 4/1992 |
| JP | 4-366480 | | 12/1992 |
| JP | 4-366481 | | 12/1992 |
| JP | 04366481 A | * | 12/1992 |
| JP | 6 342575 | | 12/1994 |
| JP | 7-176030 | | 7/1995 |
| JP | 07176030 A | * | 7/1995 |
| JP | 2001-110164 | | 4/2001 |

OTHER PUBLICATIONS

Translation of abstract JP-Publicationtion No. 04366481, Dec. 18, 1992.*
Translation of abstract JP-Publication No. 61165765, Jul. 26, 1986.*
Translation of JP-Publication No. 07176030, Jul. 14, 1995.*

* cited by examiner (A)

(B)

MAGNETIC TAPE CARTRIDGE AND RECORDER/REPRODUCER A MAGNETIC TAPE CARTRIDGE

TECHNICAL FIELD

The present invention relates to a magnetic tape cartridge and a magnetic tape cartridge recording/reproducing apparatus, which prevent a magnetic head from suffering damage due to electrostatic discharge of charges accumulated on a magnetic tape.

BACKGROUND ART

Conventionally, in the field of electronic computers, as their size is reduced and the throughput speed increases, there are increasing demand for magnetic disk apparatuses and other external recording apparatuses wherein they should have higher recording density and higher access speed. Especially in the magnetic disk unit, as the recording density is improved, the recording bit is reduced, and therefore there is a problem in that the output in reproduction by a magnetic head is lowered. For solving this problem, differing from a conventional apparatus using solely one electromagnetic induction type head for use both in recording and reproduction, a recording/reproducing apparatus using a recording head and a reproducing head which are separately provided, namely, using an electromagnetic induction type head for recording and an MR head (magneto-resistive head) for reproduction utilizing a magnetoresistance effect is developed.

The MR heads are roughly classified into AMR (anisotropic magneto-resistance) heads utilizing anisotropic magnetoresistance effect and GMR (giant magneto-resistance) heads utilizing giant magnetoresistance effect. Particularly, the GMR head can realize recording with a density as high as 3 gigabits or more per 1 square inch, and hence the GMR head is mainly used in the field of magnetic disk.

On the other hand, the AMR heads are introduced into magnetic tape cartridge of a single reel type, typically, for example, a DLT (digital linear tape) or LTO (linear tape open format cartridge) and used for reproduction of a recording/reproducing system for magnetic tape. From the technical changes of a hard disk (HD), it is expected that the GMR head will replace the AMR heads in the near future to become the main force in magnetic tape systems.

However, when the GMR head is introduced as a reproducing head in the magnetic tape system, a problem of prevention of ESD (electrostatic discharge) is encountered as a technical issue to be solved.

The ESD prevention is more severe in the GMR head than that in the AMR head, and ESD even at a level that causes no problem in the AMR head can be at a charge level sufficient to break the spin valve element constituting the GMR head. Of course, in the AMR head, the cartridge or magnetic tape may be charged to an excessive amount during a long-term storage or actual use, and the ESD level is required to be lowered from the viewpoint of reliability, although that not constituting a serious problem.

In conventional HD applications, the magnetic head is basically put above the magnetic disk so as not to be directly in contact with the magnetic disk, and the HD is operated only in a grounded housing to satisfactorily ground both the magnetic disk and the magnetic head, thus preventing ESD.

On the other hand, the magnetic tape system is basically removable, and, in jukebox type library using a robotics operation, an action of drawing a cassette is inevitable, and therefore, not only is a possibility of ESD even higher than that of the HD, but also a danger of ESD is considerably high when the use environment is at a low humidity. From this point of view, in the GMR heads in general, or in the AMR heads depending on the actual use environment and time, the high density magnetic recording tape system can in principle have a recording/reproducing density equivalent to that of the HD, but it cannot be satisfactorily realized in the actual application due to the problem of ESD.

In order to solve the above mentioned problems, a method of improving the circuit to prevent ESD is considered as disclosed in Examined Japanese Patent Application Publication No. H07-92718, for example, but it is still not possible to obtain a structure which surely enables drain of electrical charges when the magnetic tape and the head operate both in a moving state. On the other hand, for lowering the electric resistance of a coating type magnetic film, an attempt to add conductive carbon black is made, but, not only does the addition of a nonmagnetic material, which is not a magnetic material, lower the electromagnetic conversion properties, but also the resistance value is roughly controlled, and therefore this is not suitable for control of the performance with high yield.

A medium, such as a tape of a deposited type, has a structure such that the metallic film is inevitably in contact with the MR Head, and hence has in principle a considerably reduced resistance. However, from the viewpoint of the mobility of charges, the electric resistance of the medium is too low, and, when static electricity is generated at a certain point in time, charges move toward the head having the lowest resistance, so that the spin valve element of the GMR head is easily broken.

In view of the above problems, the present invention has been made, and an issue is to provide a magnetic tape cartridge and an apparatus for recording/reproducing the same, which can prevent the magnetic tape from being charged to avoid damage of the magnetic head while lowering the resistance of the magnetic tape and maintaining optimum electromagnetic conversion properties.

DISCLOSURE OF THE INVENTION

The present inventors have made devote efforts with a view toward solving the above-mentioned problems and, as a result, it has been found that, by lowering the electric resistance of the magnetic tape and grounding the magnetic tape to prevent the magnetic tape from being charged, electrostatic discharge damage of the magnetic head, especially the magnetic head constituted by an MR element is avoided, and the present invention has been completed.

Specifically, a magnetic tape cartridge of the present invention is characterized in that the reel hub is formed from a conductive material and one end portion of the magnetic tape connected to the reel hub has a surface resistivity [$\Omega$/sq] in the order of $10^7$ or less. The reel hub formed from a conductive material is electrically connected to the reel drive shaft upon loading the tape, and hence the reel drive shaft is electrically grounded to prevent the magnetic tape from being charged. In this construction, it is necessary that at least the surface of the reel drive shaft be constituted by a conductive material, such as a metal, and the electric resistance [$\Omega$] of from the reel hub as a ground terminal to the ground (hereinafter, referred to as "ground resistance") be in the order of $10^7$ or less.

The wording "in the order of $10^7$" used here means values represented by $n \times 10^7$ wherein n is a number of 1 to less than 10. Accordingly, the wording "in the order of $10^7$ or less"

means values less than $1\times10^8$. These wordings used in the claims and descriptions below have the same meanings.

In addition, another magnetic tape cartridge of the present invention is characterized in that the cartridge body is formed from a conductive material, and the magnetic tape has surfaces individually having a surface resistivity [$\Omega$/sq] in the order of $10^7$ or less and the magnetic tape is electrically connected to the cartridge body. The electrical connection between the cartridge body and the magnetic tape is made by providing, for example, a conductive arm member between the inner wall of the cartridge body and the magnetic tape, enabling drain of electrical charges on the magnetic tape toward the cartridge body side. In this case, the cartridge body is electrically grounded to prevent the magnetic tape and cartridge body from being charged. In this case, it is necessary that the electric resistance [$\Omega$] of from the arm member as a ground terminal to the ground (hereinafter, referred to as "ground resistance") be in the order of $10^7$ or less.

Further, A magnetic tape cartridge recording/reproducing apparatus of the present invention is characterized in that it includes at least a magnetic head for recording information on a magnetic tape or reproducing information recorded on the magnetic tape, and a plurality of guide rollers for guiding the traveling magnetic tape, wherein at least one of the guide rollers is electrically grounded, and wherein the traveling surface of the magnetic tape in contact with the grounded guide roller has a surface resistivity [$\Omega$/sq] in the order of $10^7$ or less. This construction prevents the magnetic tape, which travels while being in contact with the guide rollers, from being charged. In this case, it is necessary that the electric resistance [$\Omega$] of from the guide roller as a ground terminal to the ground (hereinafter, referred to as "ground resistance") be in the order of $10^7$ or less.

For lowering the electric resistance of the magnetic tape, especially the electric resistance on the magnetic surface side without lowering the electromagnetic conversion efficiency, it is preferred that the magnetic tape includes a nonmagnetic conductor layer constituted by a nonmagnetic conductive material disposed between a plastic film and a magnetic layer.

BRIEF DESCRIPTION OF THE DRAWINGS

FIGS. 5(A) and (B) are perspective views diagrammatically showing the connection portion between a magnetic tape and a tape reel applied to the embodiment of the present invention, wherein FIG. 5(A) shows a mode in which the magnetic tape is fixed so that the magnetic surface side of the magnetic tape is in contact with the reel hub, and FIG. 5(B) shows a mode in which the magnetic tape is fixed so that the back surface side of the magnetic tape is in contact with the reel hub.

FIG. 13A to 13B are diagrammatic views showing examples of variations of the forth embodiment of the present invention, wherein FIG. 13A shows an example of the construction in which a magnetic tape travels so that the magnetic surface of the magnetic tape is in contact with the guide rollers immediately behind and immediately ahead of the magnetic head, FIG. 13B shows an example of the construction in which a magnetic tape travels so that the magnetic surface of the magnetic tape is in contact with the guide roller immediately behind the magnetic head.

BEST MODE FOR CARRYING OUT THE INVENTION

Hereinafter, embodiments of the present invention will be described with reference to the drawings. In the following embodiments, an explanation is made on an example in which the magnetic tape cartridge is applied to a single reel type magnetic tape cartridge (DLT type), typically a magnetic recording medium for use in computer data recorder.

Figure 1:
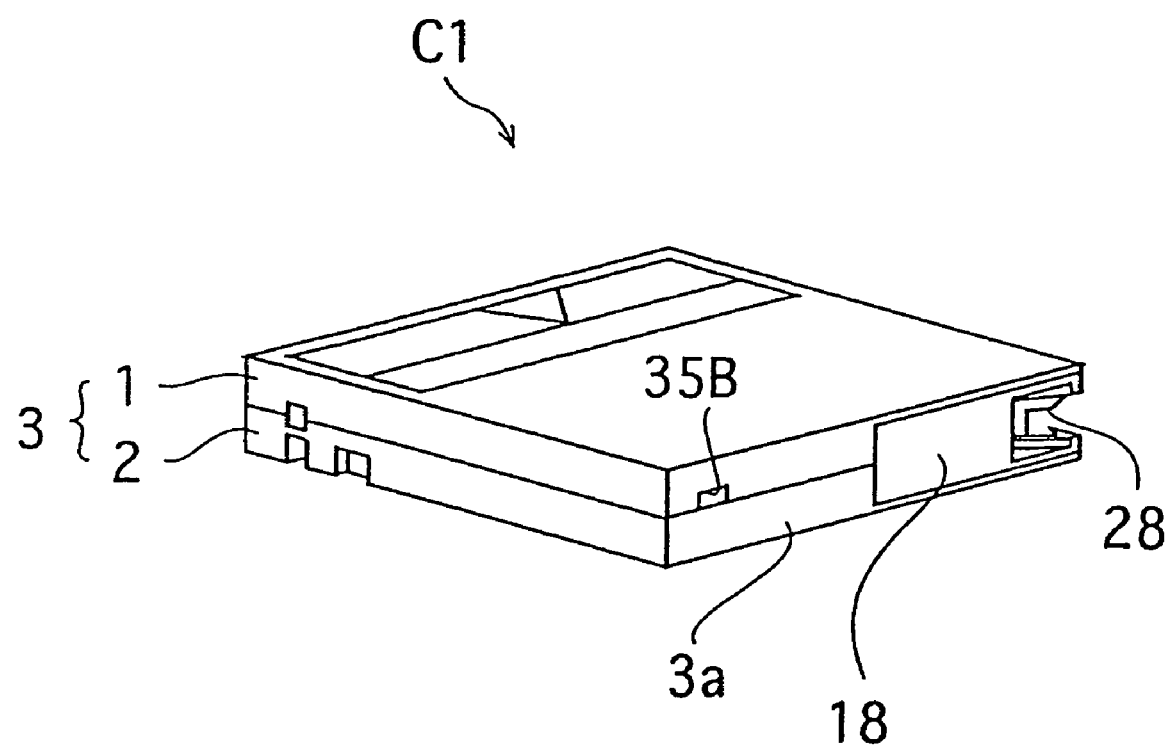
FIG. 1 is a perspective view showing whole of a magnetic tape cartridge according to the embodiment of the present invention.
Figure 2:
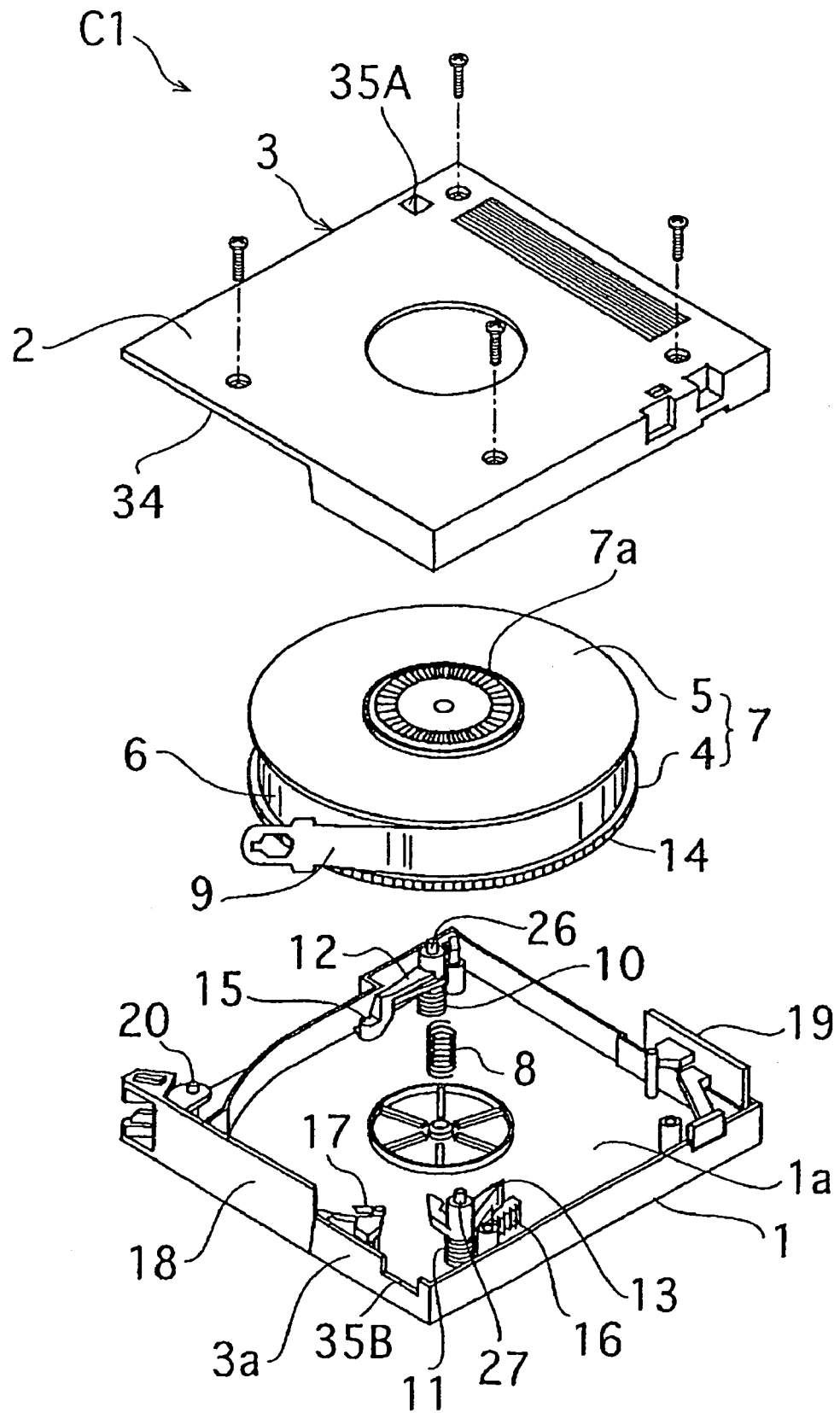
FIG. 2 is an exploded perspective view of a magnetic tape cartridge according to the embodiment of the present invention.
Figure 3:
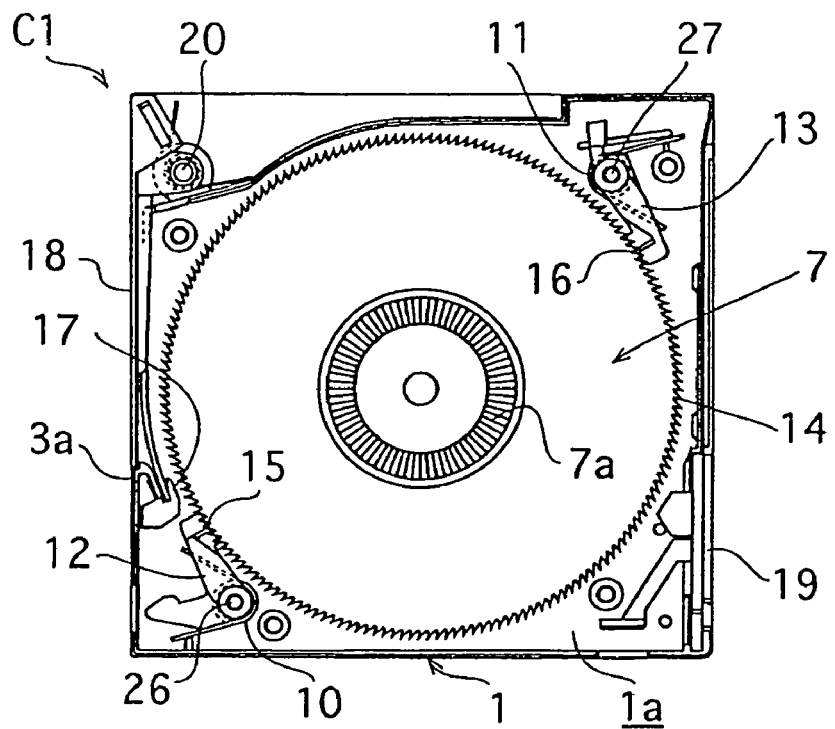
FIG. 3 is a plan view of the inside construction of a magnetic tape cartridge according to the embodiment of the present invention as viewed from the lower half side.

First, the whole construction of a magnetic tape cartridge C1 according to the present embodiment is described with reference to FIGS. 1 to 3. In FIG. 2, the magnetic tape cartridge C1 is shown upside down.

In the magnetic tape cartridge C1, an upper half 1 and a lower half 2 constituted by, for example, a composite material of polycarbonate and glass fiber are bonded together to form a cartridge body 3, and a single tape reel 7 having a disc-form upper flange 4 and lower flange 5 is housed in the cartridge body 3 so that it is capable of rotating.

In the tape reel 7, a magnetic tape 6 having a leader tape 9 connected to its one end is wound round a reel hub provided on the upper flange 4 so that the magnetic surface of the magnetic tape is arranged on the inner side. The tape reel 7 has a ring-form bearing which is pressed and fixed into a circular recess portion formed in the center portion of the upper flange 4, and the tape reel rotates by a not shown reel rotating shaft fitted to the bearing. In addition, one end of the tape reel 7 is in contact with an inner surface 1a of the upper half 1, and another end is always pressed to the lower half 2 side by a reel spring 8 which is in contact with the reel rotating shaft. The reel spring 8 is constituted by a compression coiled spring in a cylindrical form.

In the magnetic tape cartridge C1 which is not set in a recording/reproducing apparatus, namely, upon being unused, the tape reel 7 cannot rotate due to a pair of brake members 12, 13 pressed by torsion springs 10, 11. Specifically, the tape reel 7 cannot rotate due to mating portions 15, 16 which are formed on, respectively, the brake members 12, 13, and which mate with a gear portion 14 formed on the outer periphery of the upper flange 4. The torsion springs 10, 11 and the brake members 12, 13 are rotatably fitted to, respectively, supporting shafts 26, 27 provided on the inner surface 1a of the upper half 1.

In addition, upon being unused, the magnetic tape 6 is completely wound round the tape reel 7, and the leader tape 9 is hooked by a hook 17 provided on the side of a front face 3a of the cartridge body 3. An opening portion 34 through which the magnetic tape 6 is drawn out of the cartridge body 3 is in a closed state by a switching door 18 which is rotatably fitted to a shaft 20.

On the other hand, in the magnetic tape cartridge C1 which is set in a recording/reproducing apparatus, namely, upon being used, when a reel stand on the recording/reproducing apparatus side rises, the tape reel 7 repels the force of the reel spring 8 to be brought up to the center portion of the cartridge body 3 and reel unlock plugs on the recording/reproducing apparatus side are inserted into reel unlock holes 35A, 35B to unlock the brake members 12, 13, thus enabling the tape reel 7 to rotate. Further, the switching door 18 is in an open state by a door switching means provided on the recording/reproducing apparatus side. Further, the magnetic tape 6 is drawn out of the cartridge body 3 by a tape drawing means provided on the recording/reproducing apparatus side.

In the magnetic tape cartridge C1, a wrong deletion prevention member 19 for preventing wrong recording and wrong deletion on the magnetic tape 6 is provided. The wrong deletion prevention member 19 is slidably provided on the back surface of the cartridge body 3 which is on the opposite side of the switching door 18.

Next, the construction of the magnetic tape 6 in the present embodiment is described.

Figure 4:
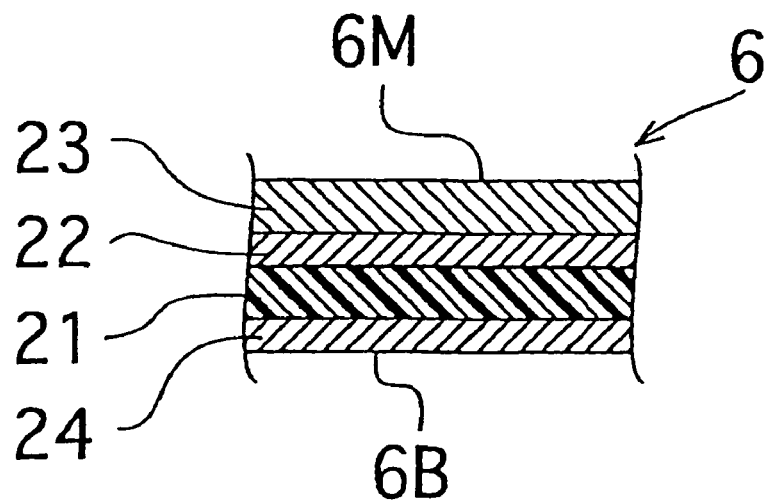
FIG. 4 is a cross-sectional view showing the construction of a magnetic tape applied to the first embodiment of the present invention.

FIG. 4 is a cross-sectional view showing the construction of the magnetic tape 6. In the magnetic tape 6 in the present embodiment, a magnetic layer 23 is formed on the surface of a plastic film 21 through a nonmagnetic conductor layer 22 constituted by a nonmagnetic conductive material, and a back coat layer 24 constituted by a nonmagnetic conductive material is formed on the back surface of the plastic film 21. In the following descriptions, the surface on which the magnetic layer 23 is formed is referred to as "magnetic surface 6M", and the surface on which the back coat layer 24 is formed is referred to as "back surface 6B".

The plastic film 21 has a thickness of 1 to 100 μm, and is formed by melt or dissolution extrusion of an organic polymer, if necessary, followed by orientation in the longitudinal direction and the width direction. Examples of organic polymers include polyolefins, such as polyethylene and polypropylene, polyesters, such as polyethylene terephthalate and polyethylene-2,6-naphthalate, polyamides, vinyl chloride, vinylidene chloride, polyvinyl alcohols, aromatic polyamides, and polyamideimides.

As the nonmagnetic conductive material constituting the nonmagnetic conductor layer 22 and the back coat layer 24, a nonmagnetic conductive material, such as Al, Ti, Si, Cu, Zr, or carbon black, is used. As a method for forming the nonmagnetic conductor layer 22 and back coat layer 24 on the top and back surfaces of the plastic film 21, a conventionally known deposition method, such as an application method, a plating method, a vapor deposition method, a sputtering method, or an ion plating method, can be used.

The magnetic layer 23 is formed by dispersing ferromagnetic oxide powder, such as γ ferrite, Co-containing γ ferrite, or chromium oxide, or ferromagnetic metallic powder, such as Fe, Co, Ni, Fe—Co, or Fe—Ni, in an organic adhesive, such as a vinyl chloride polymer, an acrylic ester polymer, or an urethane polymer, and applying the resultant mixture onto the nonmagnetic conductor layer 22 and curing it.

As mentioned above, in the magnetic tape 6 in the present embodiment, by virtue of having the nonmagnetic conductor layer 22 and back coat layer 24 formed, the electric resistance is lowered while maintaining optimum electromagnetic conversion properties of the magnetic layer 23, as compared to that of a magnetic tape in which the nonmagnetic conductor layer 22 and back coat layer 24 are not formed.

By this construction, the resistance of the magnetic tape 6 is lowered while maintaining optimum electromagnetic conversion properties of the magnetic layer 23, so that the magnetic tape 6 can be prevented from being charged. However, the magnetic tape 6 merely having this construction has a quasi-capacitor structure, and therefore the magnetic tape cartridge C1 disadvantageously serves as a storage for charges when the magnetic tape cartridge C1 is not set in a recording/reproducing apparatus, namely, upon being unused. For this reason, when charges temporarily undergo spark toward the magnetic head during the use of the magnetic tape cartridge C1, the magnetic head suffers fatal damage.

For preventing this, in the present invention, the magnetic tape 6 is grounded to prevent the magnetic tape 6 from being charged, thus avoiding damage of the magnetic head, especially the magnetic head constituted by an MR element.

FIRST EMBODIMENT

In the present embodiment, the upper flange 4 (including a reel hub 7A) and lower flange 5 constituting the tape reel 7 is formed from a conductive material, such as a metal or a conductive plastic, and the magnetic tape 6 in the above construction is electrically connected to the tape reel 7.

With respect to the metal material forming the tape reel 7, there is no particular limitation, but a metal material having a relatively small specific gravity, such as an aluminum, magnesium, or titanium metal material, is preferably used as a constituent material for the tape reel. The conductive plastic means a synthetic resin material, such as POM or ABS, which contains conductive filler so as to have conductivity.

Here, the conductive filler means filler added for imparting conductivity to a material, and examples include particulate filler, flake filler, and fibrous filler. A representative example of particulate filler is conductive carbon, and examples of flake filler include aluminum flake, nickel flake, and nickel coated mica. Examples of fibrous filler include various fibers of carbon, aluminum, copper, brass, and stainless steel.

The connection of the magnetic tape 6 to the tape reel 7 is made, as diagrammatically shown in FIG. 5(A) and FIG. 5(B), using a conventionally well known damper 30 for clamping the end portion of the magnetic tape 6 to the reel hub 7A of the tape reel 7 (clamping portion and the like are not shown). The damper 30 is constituted by a nonconductive material, such as a synthetic resin material, and disposed so as to face a recess formed in the reel hub 7A and fitted to the reel hub 7A by being mechanically pressed from the back.

The electrical connection between the magnetic tape 6 and the tape reel 7 has a mode such that the magnetic surface 6M of the magnetic tape 6 is electrically connected to the reel hub 7A as shown in FIG. 5(A) and a mode such that the back surface 6B of the magnetic tape 6 is electrically connected to the reel hub 7A as shown in FIG. 5(B). In the present embodiment, the contact resistance [Ω] between the magnetic tape 6 and the reel hub 7A is in the order of $10^7$ or less.

The mode in which the magnetic surface 6M of the magnetic tape 6 is electrically connected to the reel hub 7A has a construction such that the magnetic layer 23 in the end portion region of the magnetic tape 6 is completely or incompletely (so that the magnetic layer 23 partially remains) removed to expose the underlying nonmagnetic conductor layer 22, and the tape is held by the damper 30 in a state such that the exposed nonmagnetic conductor layer 22 is in contact with the reel hub 7A. In the present embodiment, the magnetic layer 23 is removed so that the surface resistivity [Ω/sq] of the magnetic surface 6M connected to the reel hub 7A becomes in the order of $10^7$ or less.

When the surface resistivity of the magnetic layer 23 is in the order of $10^7$ or less, that is, the surface resistivity of the magnetic surface 6M is in the order of $10^7$ or less without removing the magnetic layer 23, the magnetic layer 23 may be directly brought into contact with the reel hub 7A.

On the other hand, the mode in which the back surface 6B of the magnetic tape 6 is electrically connected to the tape reel 7 has a construction such that the tape is held by the damper 30 in a state such that the back coat layer 24 of the magnetic tape 6 is in contact with the reel hub 7A. In the present embodiment, the back coat layer 24 is adjusted so that the surface resistivity [Ω/sq] of the back surface 6B connected to the reel hub 7A becomes in the order of $10^7$ or less.

When the clamper 30 is formed from a conductive material, such as a metal, both the magnetic surface 6M and the back surface 6B can be connected to the reel hub 7A in the construction of FIG. 5(A).

Figure 6:
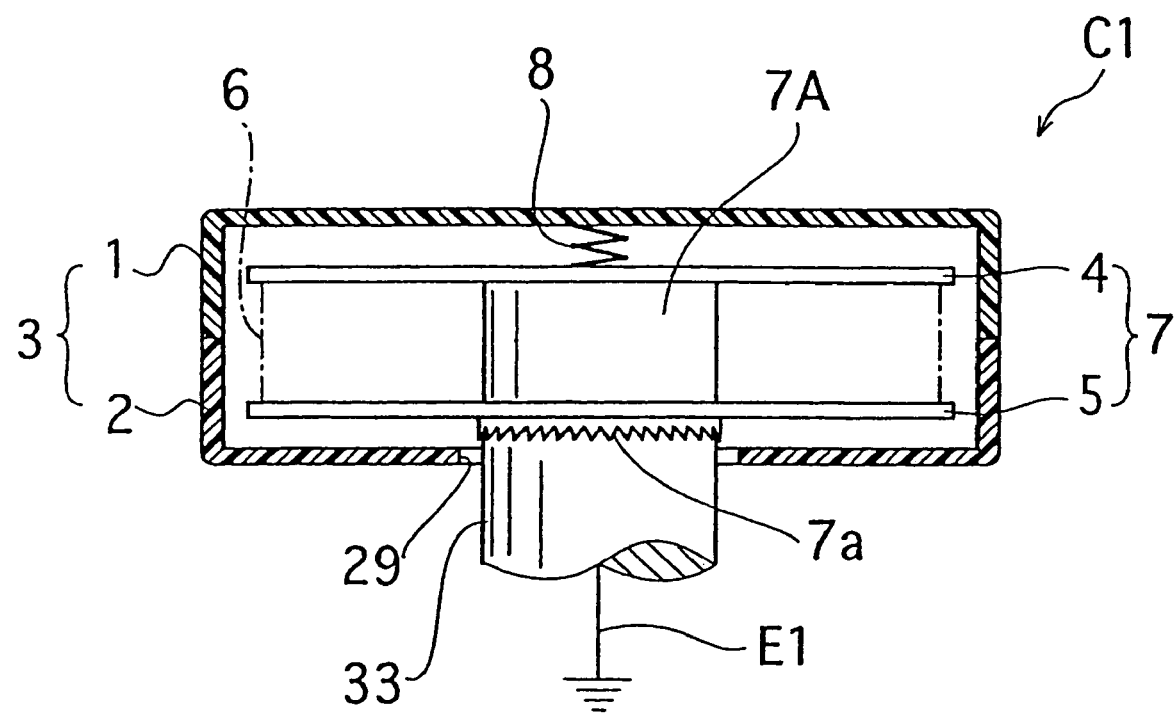
FIG. 6 is a cross-sectional view diagrammatically showing the action of a magnetic tape cartridge according to the first embodiment of the present invention.

By the construction described above, when the magnetic tape cartridge C1 is set in a recording/reproducing apparatus, namely, upon being used, as diagrammatically shown in FIG. 6, a reel drive shaft 33 on the recording/reproducing apparatus side mates with a gear portion 7a on the lower plane of the tape reel 7 through a reel shaft insert hole 29 formed in the lower plane of the cassette body 3 to drive the tape reel 7 to rotate. The reel drive shaft 33 is constituted by a metal material, such as stainless steel, and connected to a ground circuit E1 (ground resistance: $10^7$ Ω or less) using the reel hub 7A as a ground terminal, including the reel drive shaft 33, on the recording/reproducing apparatus side.

In the present embodiment, the magnetic tape 6 is connected through the conductive tape reel 7 to the reel drive shaft 33 electrically grounded, and therefore the magnetic tape 6 is prevented from being charged, and, even when being charged, electrical charges can be surely drained through the tape reel 7 toward the external ground circuit E1 including the reel drive shaft 33, so that attack to the magnetic head due to charges on the magnetic tape 6 is prevented, thus making it possible to avoid electrostatic discharge damage of the magnetic head. Especially in the recording/reproducing apparatus having as a magnetic head an MR head which is very easily affected by static charge, the present invention is effective.

SECOND EMBODIMENT

Figure 7:
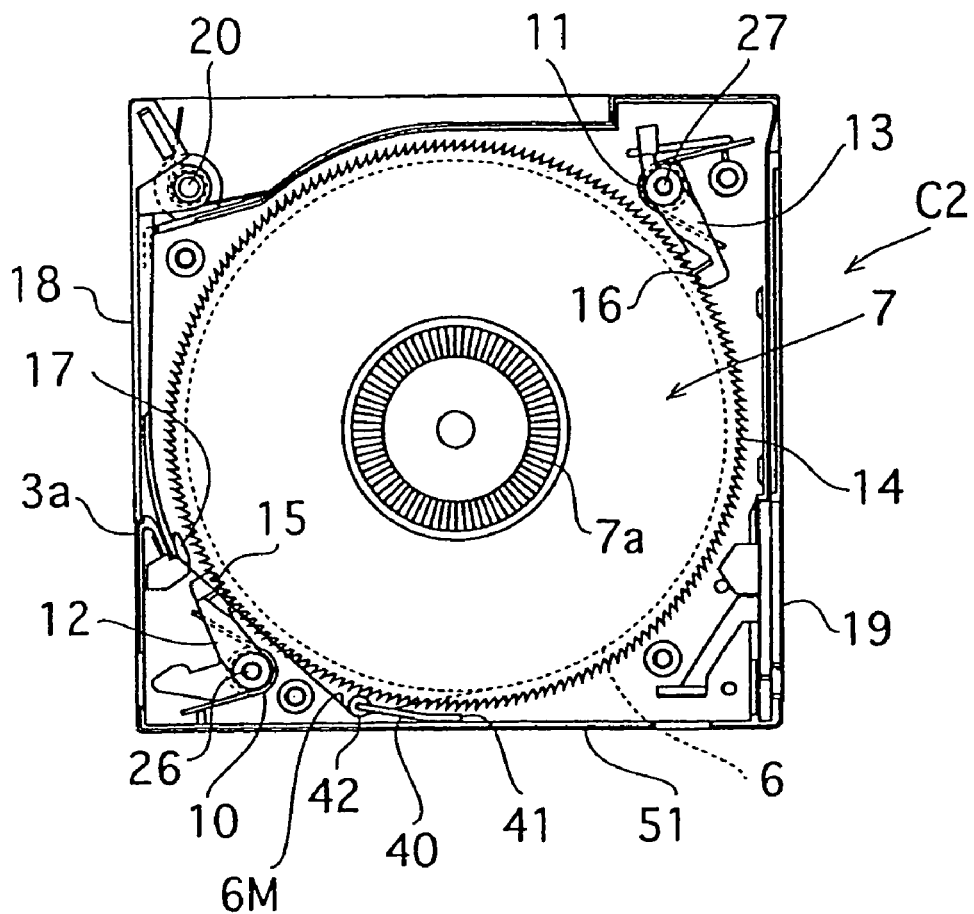
FIG. 7 is a plan view of the inside of an upper half of a magnetic tape cartridge according to the second embodiment of the present invention.
Figure 8:
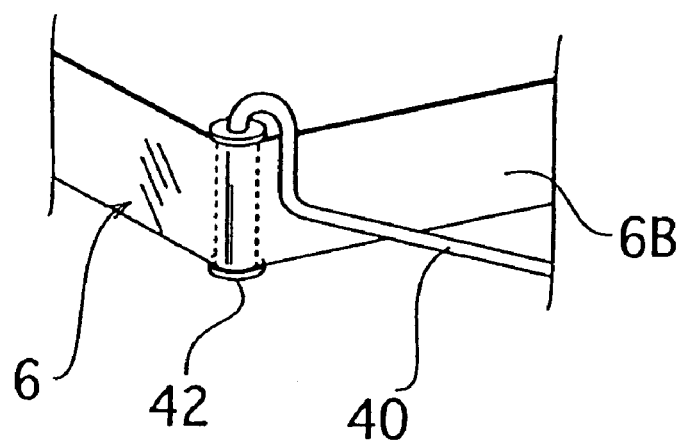
FIG. 8 is a perspective view of an essential portion of FIG. 7.
Figure 9:
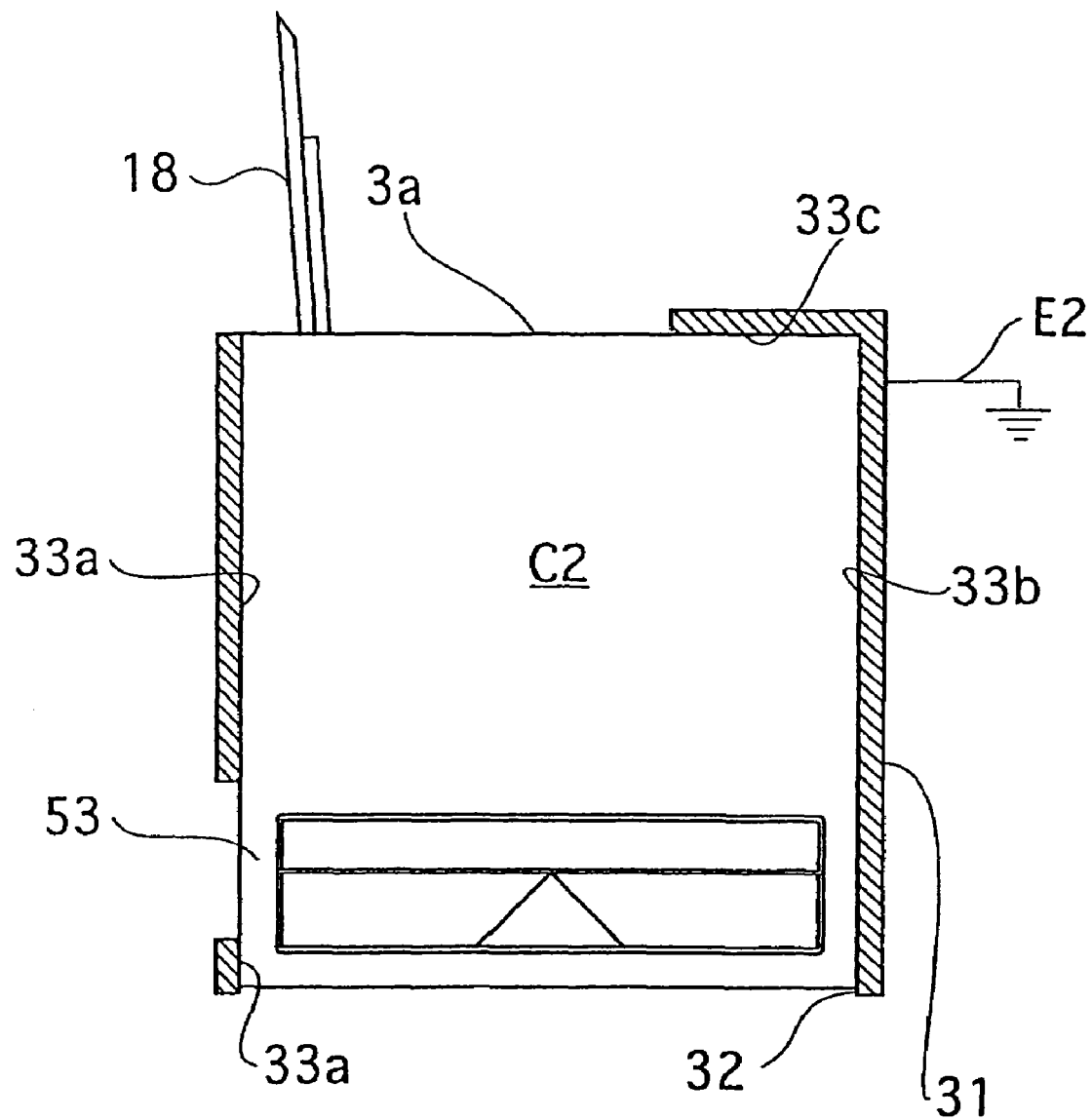
FIG. 9 is a view for illustrating a ground mode of the magnetic tape cartridge according to the second embodiment of the present invention.

FIG. 7 to FIG. 9 show a second embodiment of the present invention. In the figures for the second embodiment and those for the above first embodiment, similar parts or portions are indicated by similar reference numerals, and the detailed descriptions therefore are omitted.

A magnetic tape cartridge C2 according to the present embodiment has a construction in which an upper half 51 and a lower half (not shown) are constituted by a synthetic resin material having low discharge properties, for example, a conductive plastic to impart conductivity to a cartridge body 53.

In the cartridge body 53, there is provided an arm member 40 for electrically connecting the magnetic surface 6M of the magnetic tape 6 having the above-described construction to the inner wall of the cartridge body 53. The arm member 40 is constituted by a metal material, such as an aluminum alloy or stainless steel, or a conductive plastic, and a base portion 41 is electrically and physically connected to, for example, the inner wall of one side portion of the upper half 51 and an arm edge 42 is in contact with the magnetic layer 23 of the magnetic tape 6.

In the connection of the base portion 41 of the arm member 40 to the inner wall of the upper half 51, a conductive adhesive comprising, for example, an adhesive resin material, such as a silicone resin, containing therein metallic particles can be used. Alternatively, a construction in which the base portion 41 of the arm member 40 and the inner wall of the upper half 51 are riveted by means of a metallic rivet can be applied.

As the contact mode of the arm edge 42 to the magnetic tape 6, from the viewpoint of increasing the contact area between them to lower the contact resistance, a mode in which the arm edge 42 has an elastic contact with the magnetic tape 6 at a constant pressure is preferred.

For lowering the frictional resistance between the arm edge 42 and the traveling magnetic tape 6, the arm edge 42 has a cylindrical form capable of rotating as shown in FIG. 8, and can rotate while being in contact with the magnetic surface 6M on the inner side of the magnetic tape 6. The arm edge 42 is not rotatable and may have merely a shaft form longer than the width of the magnetic tape 6.

By virtue of the arm member 40 having the above construction, the electrical connection between the magnetic surface 6M of the magnetic tape 6 and the cassette body 53 can be easily made. In the present embodiment, the surface resistivity [Ω/sq] of the magnetic surface 6M of the magnetic tape 6 is adjusted to be in the order of $10^7$ or less.

When the magnetic tape cartridge C2 of the present embodiment having the construction described above is set in a recording/reproducing apparatus, as shown in FIG. 9, it is housed in a cassette compartment 31 in the recording/reproducing apparatus to be aligned in the recording/reproducing apparatus. The cassette compartment 31 is constituted by a housing made of a metal, such as stainless steel, and the both sides and front face of the magnetic tape cartridge C2 set through an insert hole 32 are respectively supported by inner walls 33a, 33b, 33c to align the magnetic tape cartridge C2.

The cassette compartment 31 is connected to a ground circuit E2 on the recording/reproducing apparatus side using the arm edge 42 as a ground terminal, and the ground resistance [Ω] including the arm member 40, the cartridge body 53, and the cassette compartment 31 is in the order of $10^7$ or less.

Accordingly, the magnetic tape 6 is connected through the arm member 40 and cartridge body 53 to the cassette compartment 31 electrically grounded, and therefore the magnetic surface 6M of the magnetic tape 6 is prevented from being charged, and, even when being charged, charges can be surely drained through the arm member 40 and cartridge body 53 toward the external ground circuit E2 including the cassette compartment 31, so that attack to the magnetic head due to charges on the magnetic surface 6M of the magnetic tape 6 is prevented, thus making it possible to avoid electrostatic discharge damage of the magnetic head. Especially in the recording/reproducing apparatus having as a magnetic head an MR head which is very easily affected by static charge, the present invention is effective.

THIRD EMBODIMENT

Figure 10:
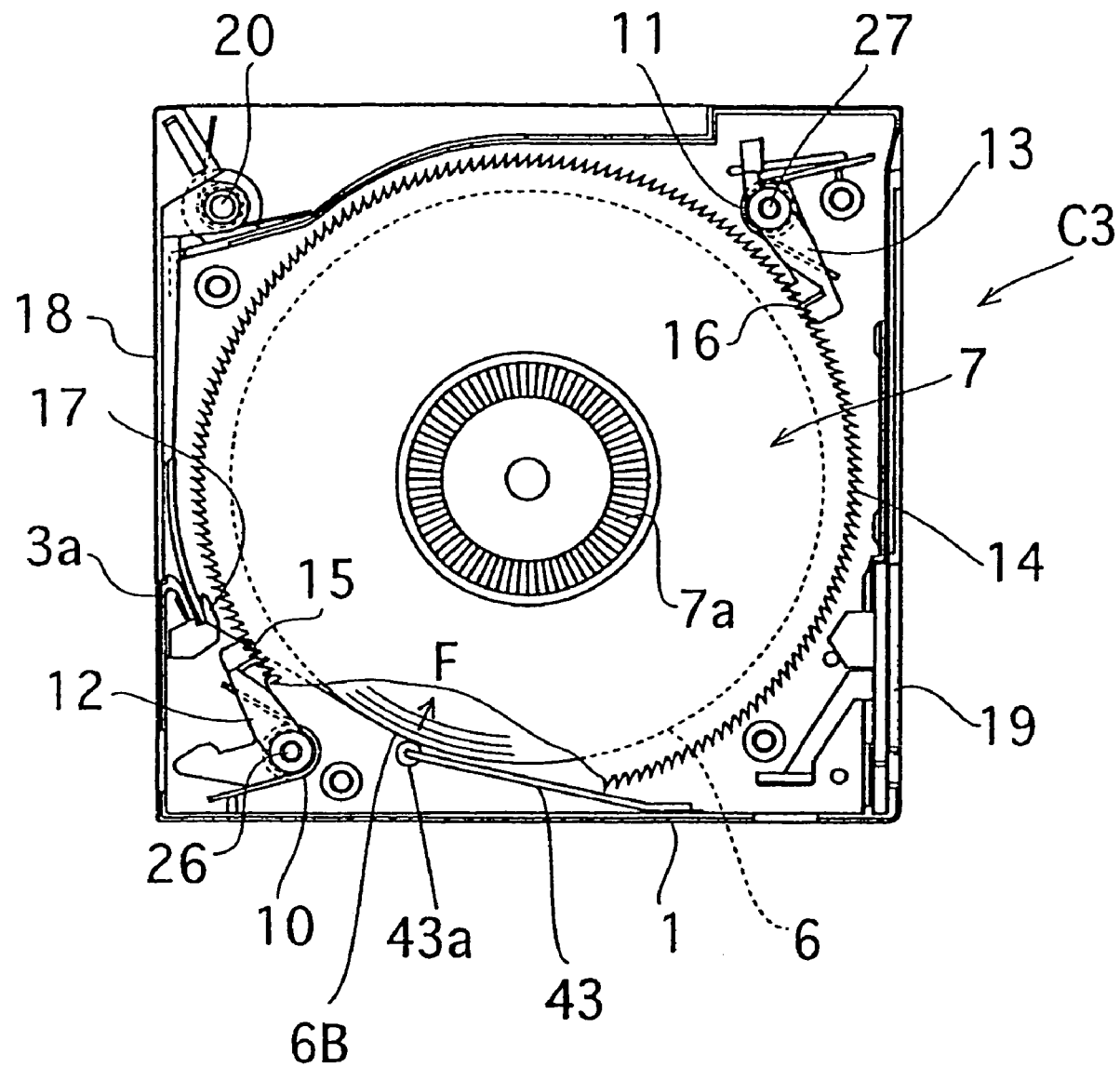
FIG. 10 is a plan view of the inside of an upper half of a magnetic tape cartridge according to the third embodiment of the present invention.

FIG. 10 shows a magnetic tape cartridge C3 according to a third embodiment of the present invention. In the figure for the third embodiment and those for the above second embodiment, similar parts or portions are indicated by similar reference numerals and the detailed descriptions therefore are omitted.

In the present embodiment, the back surface 6B of the magnetic tape 6 is electrically grounded using a conductive arm member 43. An arm edge 43a of the arm member 43 has an elastic contact with the back surface 6B of the magnetic tape 6 wound round the tape reel 7 at a predetermined elastic force F in the direction of the diameter. The arm member 43 is formed so as to have such a length that the arm edge 43a can be in contact with the reel hub 7A of the tape reel 7, so that the arm edge 43a can be constantly in elastic contact with the back surface 6B of the magnetic tape 6 according to the reduction of the winding diameter of the magnetic tape 6.

In the present embodiment, the formulation of the back coat layer 24 is adjusted so that the surface resistivity [Ω/sq] of the back surface 6B of the magnetic tape 6 becomes in the order of $10^7$ or less.

In the present embodiment, the back surface 6B of the magnetic tape 6 is prevented from being charged, and, even when being charged, charges can be surely drained through the arm member 43 and cartridge body 53 toward the external ground circuit E2 including the cassette compartment 31.

FORTH EMBODIMENT

Figure 11:
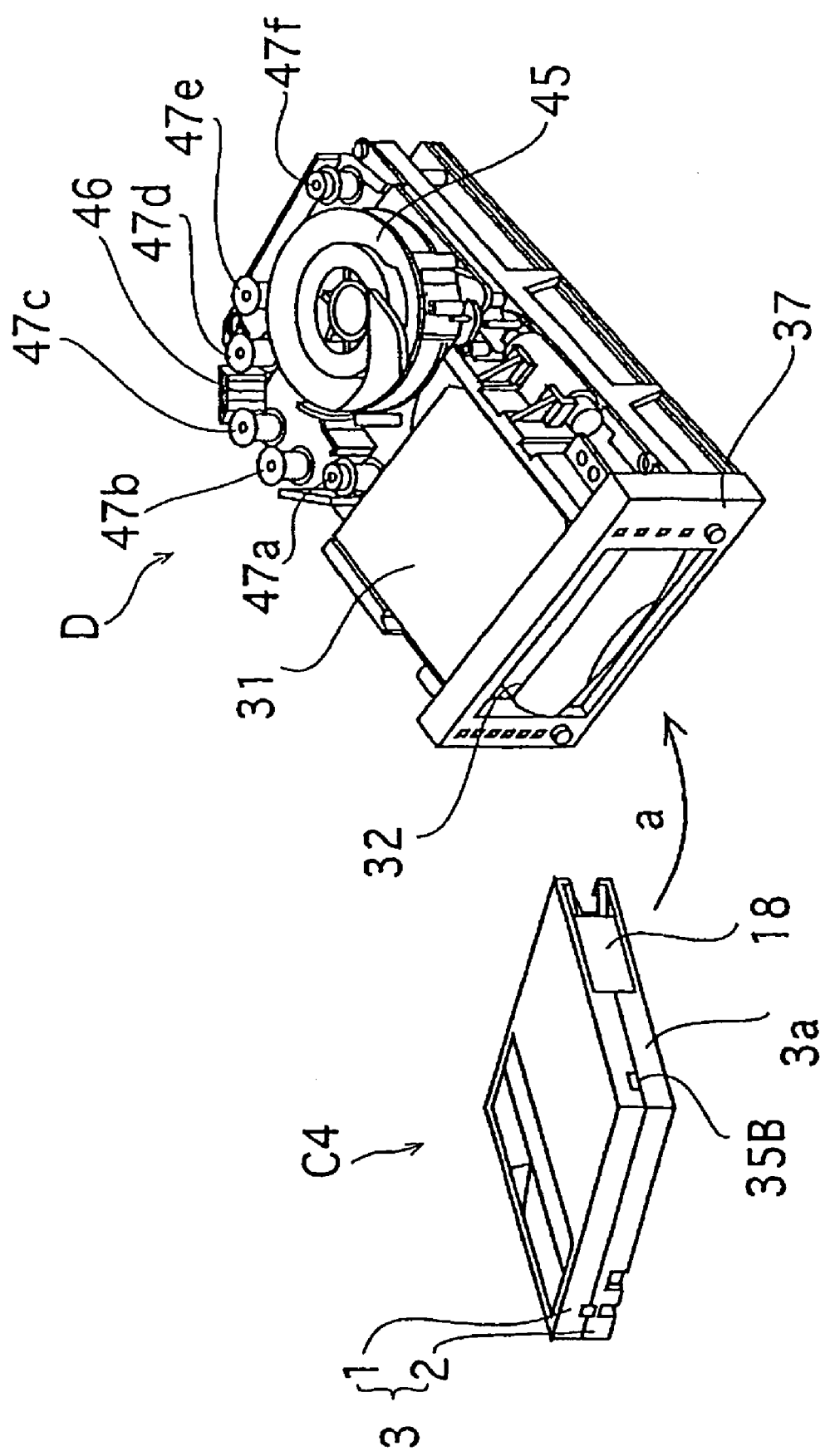
FIG. 11 is a perspective view showing a magnetic tape cartridge and a recording/reproducing apparatus according to the forth embodiment of the present invention.
Figure 12:
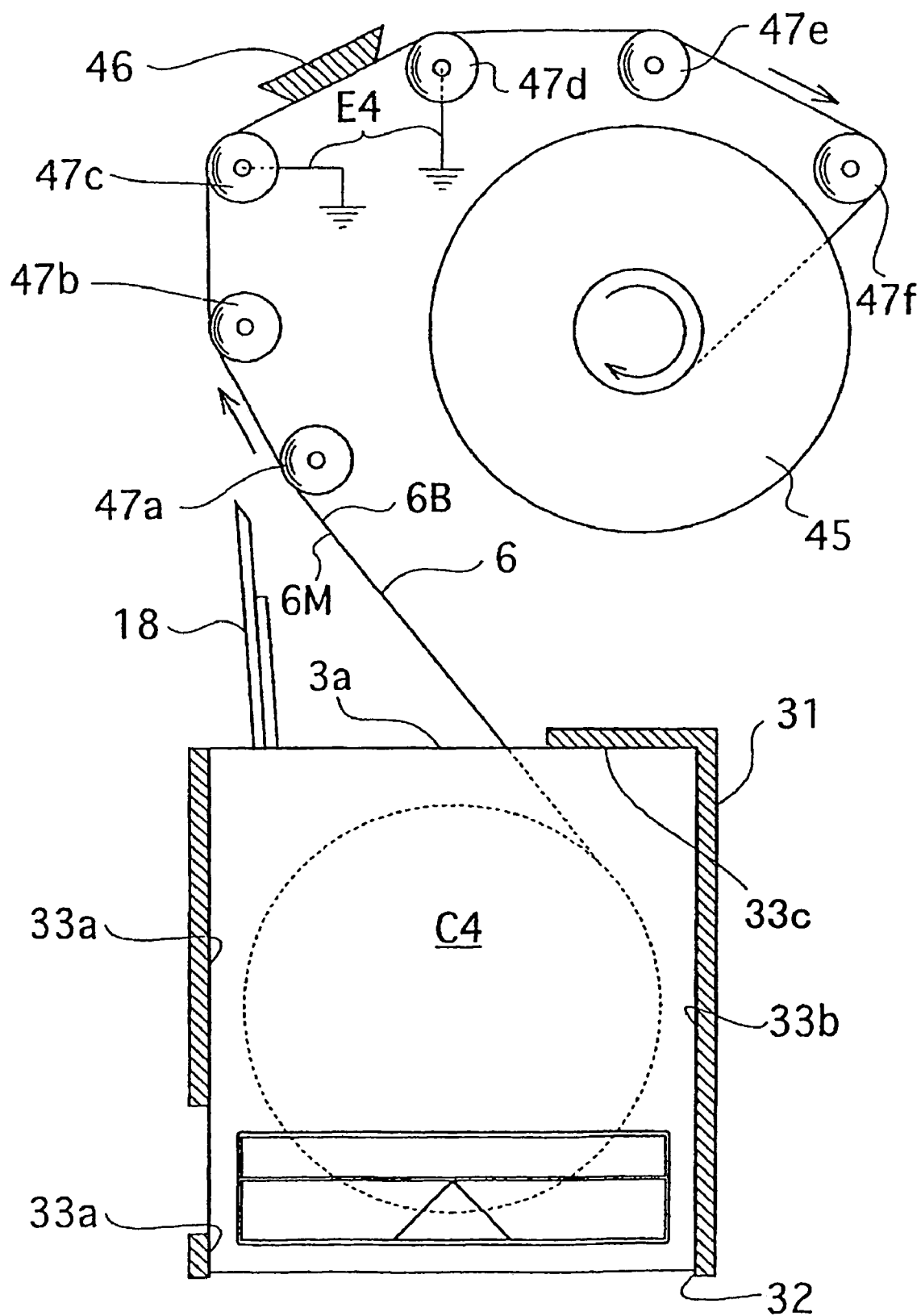
FIG. 12 is a diagrammatic view showing an essential portion of the recording/reproducing apparatus according to the forth embodiment of the present invention.

FIG. 11 and FIG. 12 show a forth embodiment of the present invention. In the figures for the forth embodiment and those for the above first and second embodiments, similar parts or portions are indicated by similar reference numerals, and the detailed descriptions therefore are omitted.

The present embodiment is different from the above embodiments in that a recording/reproducing apparatus D for recording and reproducing a magnetic tape cartridge C4 prevents the magnetic tape 6 from being charged.

As the recording/reproducing apparatus D, a recording/reproducing apparatus of a front face insert type such that the magnetic tape cartridge C4 is inserted in the direction indicated by an arrow a from the side of the front face 3a in which the switching door 18 is formed as shown in FIG. 11 is used. The magnetic tape cartridge C4 is set in the inside cassette compartment 31 through the cartridge insert hole 32 formed in a front panel 37 of the recording/reproducing apparatus D.

In the magnetic tape cartridge C4 set in the cassette compartment 31, the magnetic tape 6 is drawn by means of a tape drawing means through the opened switching door 18 and taken up by a take-up reel 45 constituted by a metal material in the recording/reproducing apparatus D. In the tape path between the magnetic tape cartridge C4 and the take-up reel 45, a plurality of guide rollers 47a, 47b, 47c, 47d, 47e, 47f constituted by a metal are provided, and, as diagrammatically shown in FIG. 12, the traveling magnetic tape 6 is guided by the guide rollers 47a to 47f. A magnetic head 46 for recording information on the magnetic tape 6 or reproducing information recorded on the magnetic tape 6 is disposed between the guide roller 47c and the guide roller 47d.

In the present embodiment, the surface resistivity [Ω/sq] of each of the magnetic surface 6M and the back surface 6B of the magnetic tape 6 is in the order of $10^7$ or less. In addition, among the plurality of guide rollers 47a to 47f, the guide rollers 47c, 47d disposed immediately behind and immediately ahead of the magnetic head 46 as viewed in the traveling direction of the magnetic tape 6 (having the magnetic head 46 disposed therebetween) are individually connected to a ground circuit E4 on the recording/reproducing apparatus D side. In this case, the ground resistance [Ω] using the guide rollers 47c, 47d as ground terminals is in the order of $10^7$ or less.

In the present embodiment, in the course of which the magnetic tape 6 in the magnetic tape cartridge C4 set in the recording/reproducing apparatus D is taken up by the take-up reel 45, the back surface 6B of the magnetic tape 6 is in contact with the guide roller 47c and guide roller 47d, and therefore the back surface 6B of the magnetic tape 6 is prevented from being charged, so that the effect similar to that of the above first embodiment can be obtained.

Figure 13A:
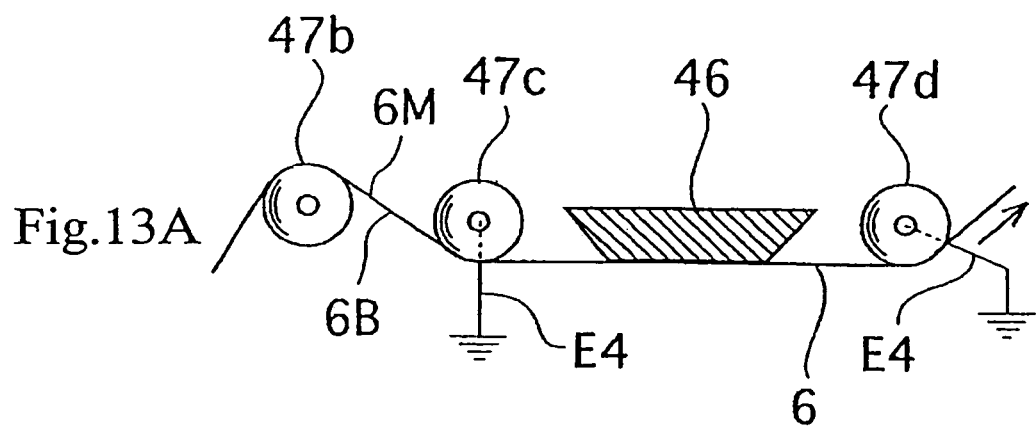

In the construction described above, the back surface 6B of the magnetic tape 6 is brought into contact with the guide rollers 47c, 47d, but, for example, as shown in FIG. 13A, when the magnetic surface 6M of the magnetic tape 6 is guided by the guide rollers 47c, 47d connected to the ground circuit E4, the magnetic surface 6M is prevented from being charged, thus making it possible to avoid electrostatic discharge damage of the magnetic head 46. Especially in the recording/reproducing apparatus having as a magnetic head an MR head which is very easily affected by static charge, this is effective.

Figure 13B:
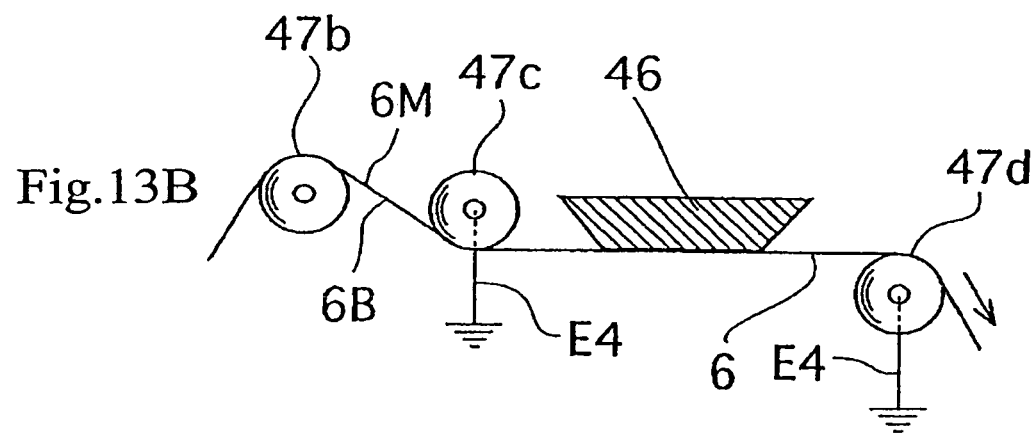
Figure 13C:
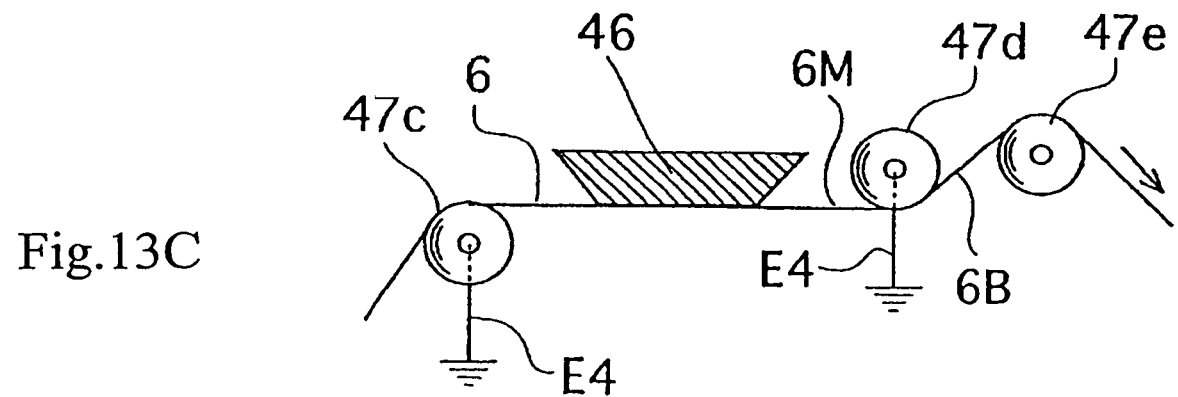
FIG. 13C shows an example of the construction in which a magnetic tape travels so that the magnetic surface of the magnetic tape is in contact with the guide roller immediately ahead of the magnetic head.

In addition, FIG. 13B is an example of the construction in which the guide roller 47c is disposed for the magnetic surface 6M of the magnetic tape 6 and the guide roller 47d is disposed for the back surface 6B of the magnetic tape 6. Further, FIG. 13C is an example of the construction in which the guide roller 47c is disposed for the back surface 6B of the magnetic tape 6 and the guide roller 47d is disposed for the magnetic surface 6M of the magnetic tape 6.

EXAMPLES

Herein below, Examples according to the preferred embodiments of the present invention will be described. In the following examples, the ground effect of the magnetic tapes in the modes described above in the first to forth embodiments was examined. Examples 1 to 4 correspond to the above-described construction of the first embodiment. Examples 5 to 8 correspond to the second and third embodiments, and Examples 9 to 12 correspond to the forth embodiment.

Example 1

On one surface of a polyethylene terephthalate (PET) film having a thickness of 6.5 μm, a 0.1 μm metallic aluminum film was formed by a vacuum deposition method, and a magnetic film having the formulation shown below was formed on the metallic aluminum film so as to have a thickness of 0.2 μ. On another surface of the PET film, as a back coat layer, a carbon black film included mainly of "KETJENBLACK" (trade name), manufactured and sold by Eastman Chemical Company, was formed so as to have a thickness of 0.7 μm.

Thus, there was prepared a magnetic tape 6 having a thickness of 7.5 μm, in which the surface resistivity of a magnetic surface 6M was 10E8 ($10^8$) Ω/sq, and the surface resistivity of a back surface 6B was 10E7 Ω/sq or less.

The formulation of the magnetic layer is as follows.

| <Formulation of the composition for magnetic layer > | |
|---|---|
| Ferromagnetic fine powder (major axis length: 0.15 μm): | 100 Parts by weight |
| Polyester polyurethane resin: (manufactured and sold by TOYOBO CO., LTD.; trade name: UR8200) | 10 Parts by weight |
| Vinyl chloride copolymer: (manufactured and sold by Nippon Zeon Co., Ltd.; trade name: MR110) | 10 Parts by weight |
| Butyl stearate: | 1 Part by weight |
| Methyl ethyl ketone: | 20 Parts by weight |
| Toluene: | 20 Parts by weight |
| Cyclohexanone: | 10 Parts by weight |
| Alumina powder: (manufactured and sold by Sumitomo Chemical Co., Ltd.; trade name: AKP50) | 10 Parts by weight |

A mixture having the above formulation of the composition for magnetic layer was kneaded by means of a continuous kneader, and then dispersed using a sand mill. Then, the resultant mixture was subjected to filtration by means of a filter having an average pore size of 1 μm to prepare a composition for magnetic layer. The composition was applied to the metallic aluminum film on the above PET film, and dried and calendered to form a magnetic layer in the present Example.

As mentioned above, in the magnetic tape 6 having the construction shown in FIG. 4, the surface resistivity on the magnetic surface 6M side was adjusted to be 10E8 Ω/sq, and the surface resistivity on the back surface 6B side was adjusted to be 10E7 Ω/sq or less. Then, the reel hub 7A (made of a metal or a conductive plastic; electric resistance: 10E7 Ω or less) of the magnetic tape cartridge C1 described in the first embodiment was connected to the ground circuit E1 as shown in FIG. 6, and an antistatic effect for the magnetic tape was evaluated under the conditions for examination shown below (Examples 1-1 to 1-18).

The evaluation was made by observation of damage of the magnetic head using an MR element. In the examination, a recording/reproducing apparatus, DLT7000 (model name), manufactured and sold by Quantum Corp., was used. It is noted that the magnetic head was replaced by a magnetic head (AMR head) used in "DCR-IP7", manufactured and sold by Sony Corporation, which was processed so that it could be mounted on the DLT7000. The number of loops of the magnetic tape (frequency of the cycles of from the start of feeding the tape to the completion of winding) was individually set at 100, 200, 500, and 1,000, and the effect of static charge caused by the increase of the tape traveling length was also evaluated.

The results of the evaluations are shown in Table 1, together with the results of the Comparative Examples under the conditions shown below. In Table 1, symbol "○" means that the magnetic head suffered no damage, that is, electrostatic discharge of the magnetic tape was satisfactorily prevented. Symbol "Δ" means that the magnetic head deteriorated due to electrostatic discharge which occurred between the magnetic head and the magnetic tape, and symbol "X" means that the MR element constituting the magnetic head was broken due to electrostatic discharge to form a hole through the element. The operating environment (conditions of temperature and humidity) was at 5° C./10% RH (relative humidity).

TABLE 1

AMR head (5° C./10% RH)

| | | Number of loops | | | |
|---|---|---|---|---|---|
| Example | | Up to 100 loops | Up to 200 loops | Up to 500 loops | Up to 1,000 loops |
| Example | 1-1 | ○ | ○ | ○ | ○ |
| | 1-2 | ○ | ○ | ○ | ○ |
| | 1-3 | ○ | ○ | ○ | ○ |
| | 1-4 | ○ | ○ | ○ | ○ |
| | 1-5 | ○ | ○ | ○ | ○ |
| | 1-6 | ○ | ○ | ○ | ○ |
| | 1-7 | ○ | ○ | ○ | ○ |
| | 1-8 | ○ | ○ | ○ | ○ |
| | 1-9 | ○ | ○ | ○ | ○ |
| | 1-10 | ○ | ○ | ○ | ○ |
| | 1-11 | ○ | ○ | ○ | ○ |
| | 1-12 | ○ | ○ | ○ | ○ |
| | 1-13 | ○ | ○ | ○ | ○ |
| | 1-14 | ○ | ○ | ○ | ○ |
| | 1-15 | ○ | ○ | ○ | ○ |
| | 1-16 | ○ | ○ | ○ | ○ |
| | 1-17 | ○ | ○ | ○ | ○ |
| | 1-18 | ○ | ○ | ○ | ○ |
| Comparative Example | 1-1 | ○ | X | X | X |
| | 1-2 | ○ | X | X | X |
| | 1-3 | ○ | ○ | ○ | Δ |

Example 1-1

Figure 5:
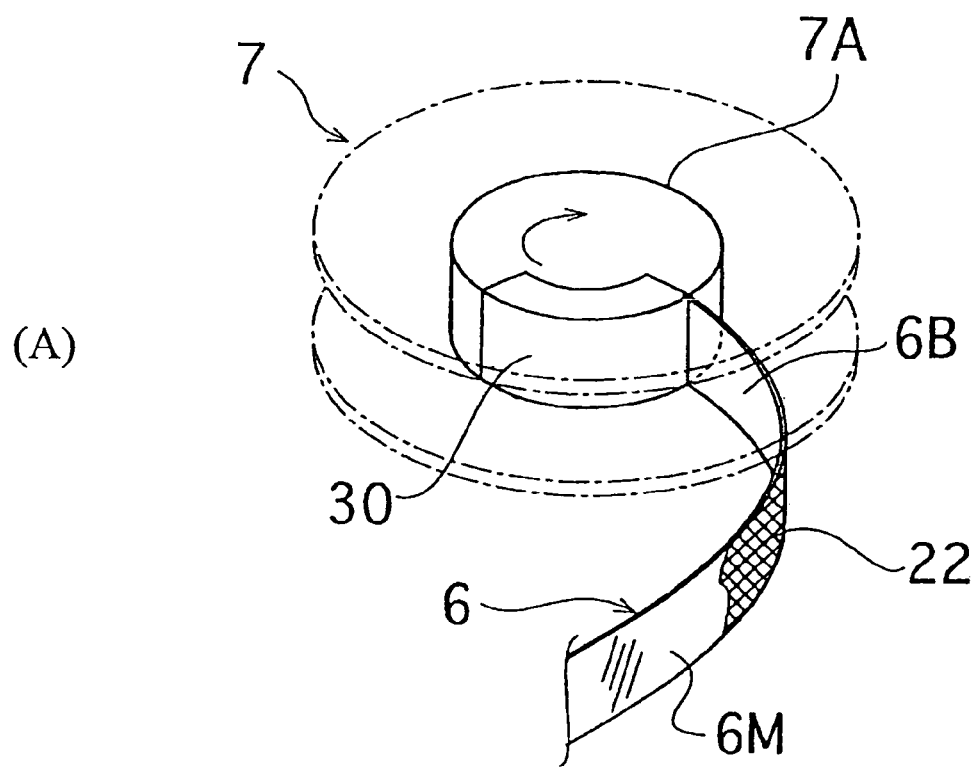
Figure 5:
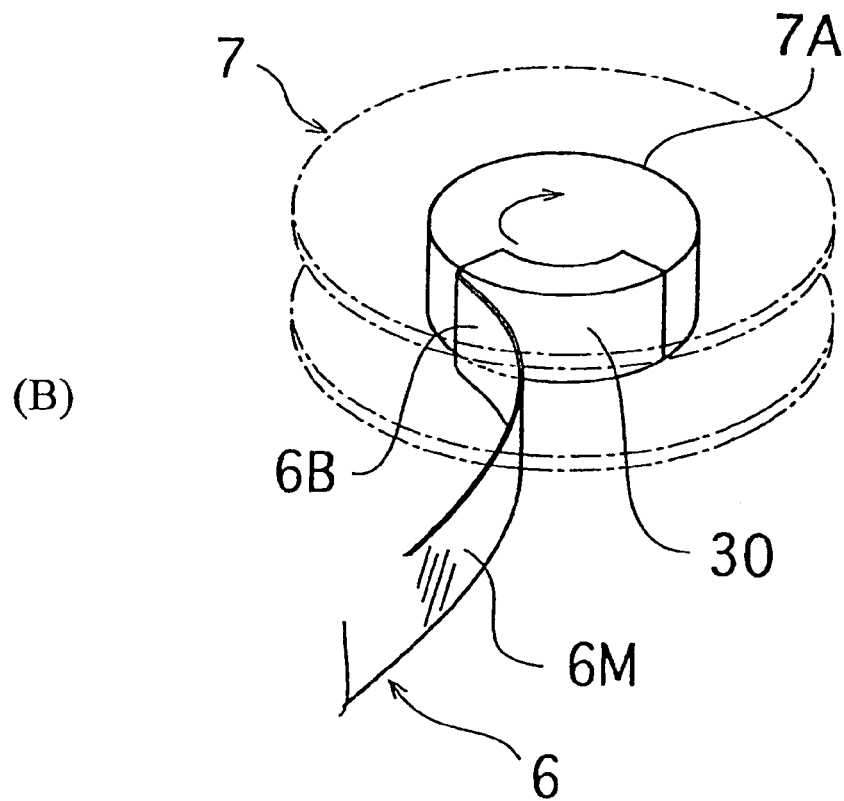

The magnetic layer 23 at each of the leader (end portion on the side of the leader tape 9; this applies to the following) and the trailer (end portion on the side of the reel hub 7A of the tape reel 7; this applies to the following) of the magnetic tape 6 was completely peeled off to expose the underlying nonmagnetic conductor layer 22, and the nonmagnetic conductor layer 22 on the leader side was directly brought into contact (not through the leader tape 9 but using, for example, an adhesive tape; this applies to the following) with a reel hub of the grounded take-up reel made of a metal in the recording/reproducing apparatus, and the nonmagnetic conductor layer on the trailer side was brought into contact the reel hub 7A made of a metal in the mode shown in FIG. 5 (A) (each contact resistance: 10E2 Ω or less).

The reason why the tape leader side was directly brought into contact with the reel hub of the take-up reel resides in that the leader tape 9 is generally constituted by a nonconductive material, such as PET. When the leader tape 9 is constituted by a conductive material, such as an aluminum alloy, the leader tape is not required to be directly brought into contact with the reel hub using an adhesive tape as mentioned above. The range of the magnetic layer 23 to be removed is a range such that the underlying nonmagnetic conductor layer 22 can be surely in contact with the reel hub, and, in the present Example, it was a portion of the magnetic tape about 5 mm from each of the tape leader and the tape trailer in the longitudinal direction of the tape (this applies to the following).

The results of the examinations can confirm that the magnetic tape 6 is prevented from being charged so that the magnetic head suffers no damage. The reason for this is presumed that the nonmagnetic conductor layer 22 having a lower resistance is electrically connected directly to the reel hub 7A of the tape reel 7 and the reel hub of the take-up reel, and hence charges on the magnetic tape 6 can escape through the individual reel hubs, thus preventing discharge on the magnetic head.

Example 1-2

The back surface 6B on the leader side of the magnetic tape was directly brought into contact with the reel hub of the grounded take-up reel made of a metal in the recording/reproducing apparatus, and the back surface 6B on the trailer side was brought into contact with the reel hub 7A made of a metal in the mode shown in FIG. 5(B).

The results of the examinations can confirm that the magnetic tape 6 is prevented from being charged so that the magnetic head suffers no damage. From this, it is found that, when the back surface 6B electrically connected to the reel hub 7A of the tape reel 7 and the reel hub of the take-up reel has a surface resistivity of 10E7 Ω/sq or less, the magnetic tape 6 is prevented from being charged.

The magnetic head does not face the back surface but the magnetic surface, and therefore a construction such that the magnetic surface of the tape is prevented from being charged is inherently needed. However, in the present Example, the construction in which the back surface of the tape is prevented from being charged provides optimum results. The reason for this is presumed that, in the magnetic tape wound round the individual reel hubs of the tape reel 7 and the take-up reel, the magnetic surface on the inner side and the back surface on the outer side are in contact with each other, and therefore charges on the magnetic surface escape through the back surface toward the individual reel hubs.

Example 1-3

The magnetic layer 23 only on the leader side of the magnetic tape was completely peeled off to expose the underlying nonmagnetic conductor layer 22 and the nonmagnetic conductor layer 22 on the leader side was directly brought into contact with the reel hub of the grounded take-up reel made of a metal in the recording/reproducing apparatus, and the magnetic surface 6M on the tape trailer side was brought into contact with the reel hub 7A made of a metal.

The results of the examinations can confirm that the magnetic tape 6 is prevented from being charged so that the magnetic head suffers no damage. From the results, it is impossible to specify as to whether the ground effect of the nonmagnetic conductor layer 22 on the tape leader side connected to the reel hub of the take-up reel is effective or the ground effect of the magnetic surface 6M (magnetic layer 23) on the tape trailer side connected to the reel hub 7A of the tape reel 7 is effective, but it is presumed that the nonmagnetic conductor layer 22 having a resistance lower than that of the magnetic surface 6M is grounded to prevent the magnetic tape from being charged.

Example 1-4

The back surface 6B on the leader side of the magnetic tape was directly brought into contact with the reel hub of the grounded take-up reel made of a metal in the recording/reproducing apparatus, and the magnetic surface 6M on the tape trailer side was brought into contact with the reel hub 7A made of a metal.

The results of the examinations can confirm that the magnetic tape 6 is prevented from being charged so that the magnetic head suffers no damage. From the results, it is impossible to specify as to whether the ground effect of the back surface B on the tape leader side connected to the reel hub of the take-up reel is effective or the ground effect of the magnetic surface 6M (magnetic layer 23) on the tape trailer side connected to the reel hub 7A of the tape reel 7 is effective, but it is presumed that the back surface 6B having a resistance lower than that of the magnetic surface 6M is grounded to prevent the magnetic tape from being charged.

Example 1-5

The leader side of the magnetic tape was wound round the reel hub of the grounded take-up reel made of a metal in the recording/reproducing apparatus through the leader tape (nonconductive leader tape; this applies to the following) 9, and the magnetic layer 23 only on the tape trailer side was completely peeled off to expose the underlying nonmagnetic conductor layer 22 and the exposed nonmagnetic conductor layer 22 was brought into contact with the reel hub 7A made of a metal in the mode shown in FIG. 5(A).

The results of the examinations can confirm that the magnetic tape 6 is prevented from being charged so that the magnetic head suffers no damage. From the results, it is found that, when the nonmagnetic conductor layer 22 is grounded at least one end portion of the magnetic tape 6, a satisfactory antistatic effect for the magnetic tape 6 can be obtained.

Example 1-6

The leader side of the magnetic tape was wound round the reel hub of the grounded take-up reel made of a metal in the recording/reproducing apparatus through the leader tape 9, and the back surface 6B on the tape trailer side was brought into contact with the reel hub 7A made of a metal in the mode shown in FIG. 5(B).

The results of the examinations can confirm that the magnetic tape 6 is prevented from being charged so that the magnetic head suffers no damage. From the results, it is found that, when the back surface 6B is grounded at least one end portion of the magnetic tape 6, a satisfactory antistatic effect for the magnetic tape 6 can be obtained.

Example 1-7

The magnetic layer 23 at each of the leader and the trailer of the magnetic tape 6 was completely peeled off to expose the underlying nonmagnetic conductor layer 22 and the nonmagnetic conductor layer 22 on the leader side was directly brought into contact with the reel hub of the grounded take-up reel made of a metal in the recording/reproducing apparatus, and the nonmagnetic conductor layer 22 on the trailer side was brought into contact with the reel hub 7A made of a conductive plastic (manufactured and sold by Mitsubishi Engineering-Plastics Corporation; trade name: CF2010 antistatic grade; surface resistivity: about 6×10E6 Ω/sq) in the mode shown in FIG. 5(A). The results of the examinations can confirm that the magnetic tape 6 is prevented from being charged so that the magnetic head suffers no damage.

Example 1-8

The back surface 6B on the leader side of the magnetic tape was directly brought into contact with the reel hub of the grounded take-up reel made of a metal in the recording/reproducing apparatus, and the back surface 6B on the trailer side was brought into contact with the reel hub 7A made of the above conductive plastic in the mode shown in FIG. 5(B). The results of the examinations can confirm that the magnetic tape 6 is prevented from being charged so that the magnetic head suffers no damage.

Example 1-9

The magnetic layer 23 only on the leader side of the magnetic tape was completely peeled off to expose the underlying nonmagnetic conductor layer 22 and the nonmagnetic conductor layer 22 on the leader side was directly brought into contact with the reel hub of the grounded take-up reel made of a metal in the recording/reproducing apparatus, and the magnetic surface 6M on the tape trailer side was brought into contact with the reel hub 7A made of the above conductive plastic. The results of the examinations can confirm that the magnetic tape 6 is prevented from being charged so that the magnetic head suffers no damage.

Example 1-10

The back surface 6B on the leader side of the magnetic tape was directly brought into contact with the reel hub of the grounded take-up reel made of a metal in the recording/reproducing apparatus, and the magnetic surface 6M on the tape trailer side was brought into contact with the reel hub 7A made of the above conductive plastic. The results of the examinations can confirm that the magnetic tape 6 is prevented from being charged so that the magnetic head suffers no damage.

Example 1-11

The leader side of the magnetic tape was wound round the reel hub of the grounded take-up reel made of a metal in the recording/reproducing apparatus through the leader tape 9, and the magnetic layer 23 only on the tape trailer side was completely peeled off to expose the underlying nonmagnetic conductor layer 22 and the exposed nonmagnetic conductor layer 22 was brought into contact with the reel hub 7A made of the above conductive plastic in the mode shown in FIG. 5(A). The results of the examinations can confirm that the magnetic tape 6 is prevented from being charged so that the magnetic head suffers no damage.

Example 1-12

The leader side of the magnetic tape was wound round the reel hub of the grounded take-up reel made of a metal in the recording/reproducing apparatus through the leader tape 9, and the back surface 6B on the tape trailer side was brought into contact with the reel hub 7A made of the above conductive plastic in the mode shown in FIG. 5(B). The results of the examinations can confirm that the magnetic tape 6 is prevented from being charged so that the magnetic head suffers no damage.

From the results of the examinations in Examples 1-7 to 1-12, it is found that, when the reel hub 7A as a ground terminal has a surface resistivity of about 6×10E6 Ω/sq, a satisfactory antistat effect for the magnetic tape 6 can be obtained.

Example 1-13

The magnetic layer 23 at each of the leader and the trailer of the magnetic tape 6 was incompletely removed so that the contact resistance between the magnetic tape and the reel hub of the grounded take-up reel made of a metal in the recording/reproducing apparatus and the contact resistance between the magnetic tape and the reel hub 7A of the tape reel 7 individually became about 10E7 Ω, and the partially exposed nonmagnetic conductor layers 22 were respectively brought into contact with the reel hub of the take-up reel and the reel hub 7A of the tape reel 7.

The results of the examinations can confirm that the magnetic tape 6 is prevented from being charged so that the magnetic head suffers no damage. From the results, it is found that, when the contact resistance between the reel hub of the take-up reel or the reel hub 7A of the tape reel 7 and the magnetic tape 6 is 10E7 Ω, a satisfactory antistatic effect for the magnetic tape 6 can be obtained.

Example 1-14

The magnetic layer 23 only on the leader side of the magnetic tape 6 was incompletely removed so that the contact resistance between the magnetic tape and the reel hub of the grounded take-up reel made of a metal in the recording/reproducing apparatus became about 10E7 Ω, and brought into contact with the reel hub, and the magnetic surface 6M on the tape trailer side was brought into contact with the reel hub 7A made of a metal. The results of the examinations can confirm that the magnetic tape 6 is prevented from being charged so that the magnetic head suffers no damage.

Example 1-15

The leader side of the magnetic tape 6 was brought into contact with the reel hub of the grounded take-up reel made of a metal in the recording/reproducing apparatus through the leader tape 9, and the magnetic layer 23 on the tape trailer side was incompletely removed so that the contact resistance between the magnetic tape and the reel hub 7A of the tape reel 7 became about 10E7 Ω, and brought into contact with the reel hub 7A. The results of the examinations can confirm that the magnetic tape 6 is prevented from being charged so that the magnetic head suffers no damage.

Example 1-16

The magnetic layer 23 at each of the leader and the trailer of the magnetic tape 6 was incompletely removed so that the contact resistance between the magnetic tape and the reel hub of the grounded take-up reel made of a metal in the recording/reproducing apparatus and the contact resistance between the magnetic tape and the reel hub 7A made of the above conductive plastic of the tape reel 7 individually became about 10E7 Ω, and the partially exposed nonmagnetic conductor layers 22 were brought into contact with the respective reel hubs. The results of the examinations can confirm that the magnetic tape 6 is prevented from being charged so that the magnetic head suffers no damage.

Example 1-17

The magnetic layer 23 only on the leader side of the magnetic tape was incompletely removed so that the contact resistance between the magnetic tape and the reel hub of the grounded take-up reel made of a metal in the recording/reproducing apparatus became about 10E7 Ω, and the partially exposed nonmagnetic conductor layer 22 was brought into contact with the reel hub, and the magnetic surface 6M on the tape trailer side was brought into contact with the reel hub 7A made of the above conductive plastic. The results of the examinations can confirm that the magnetic tape 6 is prevented from being charged so that the magnetic head suffers no damage.

Example 1-18

The leader side of the magnetic tape was wound round the reel hub of the grounded take-up reel made of a metal in the recording/reproducing apparatus through the leader tape 9, and the magnetic layer 23 only on the tape trailer side was incompletely removed so that the contact resistance between the magnetic tape and the reel hub 7A made of the above conductive plastic of the tape reel 7 became about 10E7 Ω, and the partially exposed nonmagnetic conductor layer 22 was brought into contact with the reel hub 7A. The results of the examinations can confirm that the magnetic tape 6 is prevented from being charged so that the magnetic head suffers no damage.

Comparative Example 1-1

The reel hub 7A of the tape reel 7 in Example 1-5 was formed from a general polycarbonate resin having no conductivity (in the present example, polycarbonate resin S2000, manufactured and sold by Mitsubishi Engineering-Plastics Corporation; surface resistivity: 10E15 Ω/sq or more) and grounded.

Comparative Example 1-2

The reel hub 7A of the tape reel 7 in Example 1-5 was formed from the above polycarbonate resin and was not grounded.

The results of the Comparative Examples 1-1 and 1-2 can confirm that, especially when the number of loops exceeds 100, the magnetic head suffers damage due to electrostatic discharge on the magnetic tape 6, irrespective of whether the reel hub 7A is grounded or not grounded.

Comparative Example 1-3

The surface resistivity of each of the reel hub of the take-up reel and the reel hub 7A of the tape reel 7 in Example 1-1 was 10E8 Ω/sq. The results of the examinations can confirm that a relatively optimum antistatic effect for the magnetic tape 6 is recognized, but, when the number of loops exceeds 500, the magnetic head suffers damage due to electrostatic discharge on the magnetic tape 6.

From the Table 1 above, it is found that, when at least one end portion of the leader and the trailer of the magnetic tape 6 are electrically grounded, deterioration or electrostatic discharge damage of the magnetic head is prevented. In this case, the grounded surface of the magnetic tape 6 may be any of the magnetic surface 6M side and the back surface 6B side, and the reel hub 7A may be made of any of a metal and a conductive plastic.

However, as can be seen in the results of Examples 1-13 to -18 and Comparative Example 1-3, from the viewpoint of achieving optimum reliability, it is preferred that the contact resistance between the magnetic tape 6 and the reel hub 7A and the ground resistance of the ground circuit using the reel hub 7A as a ground terminal are individually 10E7 Ω or less. In other words, the amount of charges on the magnetic tape is increased as the traveling distance of the magnetic tape 6 increases, and the present Examples can confirm that, for preventing the charges from causing discharge on the magnetic head, a construction is very effective in which the connection end portion of the magnetic tape 6 on the reel hub 7A side has a surface resistivity [Ω/sq] in the order of $10^7$ or less so that the charges escape through the conductive reel hub 7A.

In addition, it is presumed that, when the magnetic surface 6M of the magnetic tape 6 has a surface resistivity [Ω/sq] in the order of $10^7$ or less, there is no need to remove the magnetic layer 23 and bring the nonmagnetic conductor layer 22 having a lower resistance into contact with the reel hub 7A. This is considered to suggest that, when the surface resistivity of the magnetic surface 6M in the magnetic tape 6 having the above construction exceeds the value in the order of $10^7$, the underlying nonmagnetic conductor layer 22 should be connected to the reel hub, and, when the surface resistivity is in the order of $10^7$ or less, the nonmagnetic conductor layer should be directly (through the magnetic layer 23) connected to the reel hub 7A.

Example 2

Figure 14:
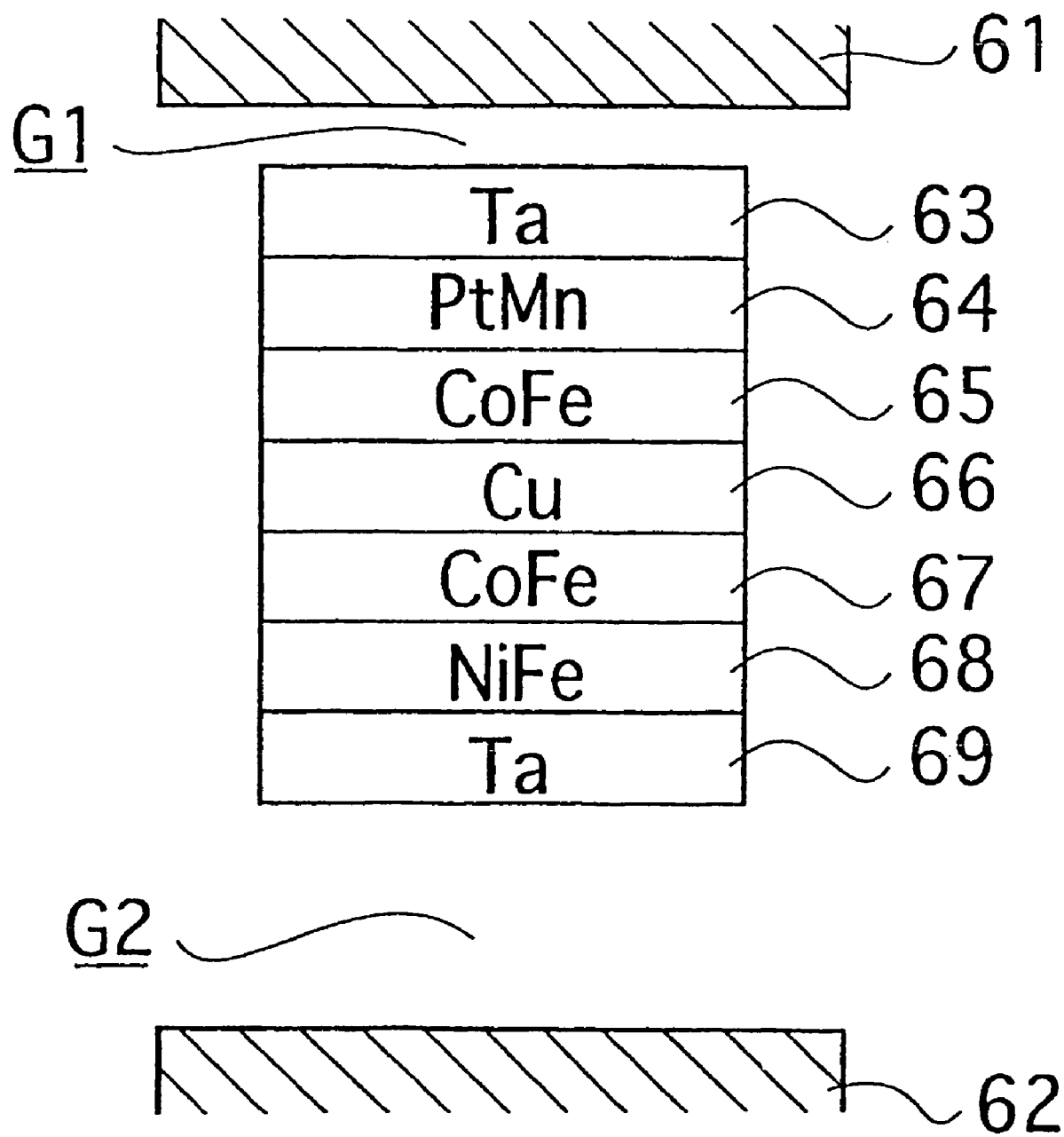
FIG. 14 is a diagrammatic view showing the element structure of a GMR head used in the Examples according to the preferred embodiments of the present invention.

As a magnetic head for the recording/reproducing apparatus used in the examinations in Example 1, one obtained by processing the GMR head having the element structure diagrammatically shown in FIG. 14 so that it could be mounted on DLT7000, manufactured and sold by Quantum Corp., was used to confirm the ground effect of the magnetic tape 6.

The element structure of the GMR head used in the examinations is constituted by, as shown in FIG. 14, forming an upper shielding layer (NiFe) 61 having a thickness of 2 to 3 μm and a lower shielding layer (NiFe) 62 having a thickness of 2 to 3 μm at a gap of 160 nm, and stacking on one another a Ta layer (5.0 nm) 63, a PtMn layer (30.0 nm) 64, a CoFe layer (2.2 nm) 65, a Cu layer (2.9 nm) 66, a CoFe layer (2.0 nm) 67, a NiFe layer (6.0 nm) 68, and a Ta layer (5.0 nm) 69 from the upper shielding layer 61 side. A gap G1 between the upper shielding layer 61 and the opposite Ta layer 63 is 37.9 nm and a gap G2 between the lower shielding layer 62 and the opposite Ta layer 69 is 69.0 nm, and the gaps G1, G2 are filled with an electrically insulating material, such as $Al_2O_3$ or $SiO_2$.

The PtMn layer 64 as a non-ferromagnetic layer locks the direction of magnetization of the CoFe layer 65 as a so-called locked MR layer in a fixed direction. The direction of magnetization of the CoFe layer 67 and NiFe layer 68 as a so-called free MR layer freely rotates in the presence of an external magnetic field (magnetic field of the signal recorded on the magnetic recording medium). The GMR head has a basic principle such that a resistance change of the element (GMR effect), which is proportional to the cosine of an angle α between the direction of magnetization of the locked MR layers and the direction of magnetization of the free MR layer, is read to output a signal for reproduction.

The AMR head has a basic structure corresponding to the construction of element structure of the GMR head in which the locked MR layer is omitted. The AMR head has a basic principle different from the principle of reproduction of the GMR head in that a resistance change of the element (AMR effect), which is proportional to the cosine of an angle β between the direction of a sense current flowing the free MR layer and the direction of magnetization of the free MR layer, is read to output a signal for reproduction.

Electrostatic discharge damage of the GMR head is caused by electrostatic charges on the magnetic tape, which penetrate the gap (G1, G2) to undergo discharge on the element. Generally, the thickness of the GMR element is as small as 0.1 to 0.3 μm, as compared to the thickness (0.5 to 1.0 μm) of the AMR element. Therefore, the GMR element may suffer damage even at a static voltage such that the element in the AMR head suffers no damage.

The present Examples are important for confirming whether or not the present invention is effective in the MR head using the GMR element which is very sensitive to static charge as mentioned above. The conditions for examination in the present Examples (Examples 2-1 to 2-18 and Comparative Examples 2-1 to 2-3) correspond to those in the above Examples 1-1 to 1-18 and Comparative Examples 1-1 to 1-3, respectively. The results of the evaluations are shown in Table 2.

TABLE 2

GMR head (5° C./10% RH)

| Example | | Up to 100 loops | Up to 200 loops | Up to 500 loops | Up to 1,000 loops |
|---|---|---|---|---|---|
| Example | 2-1 | ○ | ○ | ○ | ○ |
|  | 2-2 | ○ | ○ | ○ | ○ |
|  | 2-3 | ○ | ○ | ○ | ○ |
|  | 2-4 | ○ | ○ | ○ | ○ |
|  | 2-5 | ○ | ○ | ○ | ○ |
|  | 2-6 | ○ | ○ | ○ | ○ |
|  | 2-7 | ○ | ○ | ○ | ○ |
|  | 2-8 | ○ | ○ | ○ | ○ |
|  | 2-9 | ○ | ○ | ○ | ○ |
|  | 2-10 | ○ | ○ | ○ | ○ |
|  | 2-11 | ○ | ○ | ○ | ○ |
|  | 2-12 | ○ | ○ | ○ | ○ |
|  | 2-13 | ○ | ○ | ○ | ○ |
|  | 2-14 | ○ | ○ | ○ | ○ |
|  | 2-15 | ○ | ○ | ○ | ○ |
|  | 2-16 | ○ | ○ | ○ | ○ |
|  | 2-17 | ○ | ○ | ○ | ○ |
|  | 2-18 | ○ | ○ | ○ | ○ |
| Comparative Example | 2-1 | X | X | X | X |
|  | 2-2 | X | X | X | X |
|  | 2-3 | ○ | Δ | Δ | Δ |

From Table 2, it is found that, even when the GMR element which is very sensitive to static charge is used in the magnetic head, damage of the magnetic head is avoided under the conditions for examination in Examples 2-1 to 2-18, and the effectiveness of the present invention can be confirmed.

Example 3

The examination in Example 1 was conducted in an operating environment under conditions of temperature and humidity at 65° C./10% RH. The conditions for examination below (Examples 3-1 to 3-18 and Comparative Examples 3-1 to 3-3) correspond to those in the above Examples 1-1 to 1-18 and Comparative Examples 1-1 to 1-3, respectively. The results of the evaluations are shown in Table 3.

TABLE 3

AMR head (65° C./10% RH)

| Example | | Up to 100 loops | Up to 200 loops | Up to 500 loops | Up to 1,000 loops |
|---|---|---|---|---|---|
| Example | 3-1 | ○ | ○ | ○ | ○ |
|  | 3-2 | ○ | ○ | ○ | ○ |
|  | 3-3 | ○ | ○ | ○ | ○ |
|  | 3-4 | ○ | ○ | ○ | ○ |
|  | 3-5 | ○ | ○ | ○ | ○ |
|  | 3-6 | ○ | ○ | ○ | ○ |
|  | 3-7 | ○ | ○ | ○ | ○ |
|  | 3-8 | ○ | ○ | ○ | ○ |
|  | 3-9 | ○ | ○ | ○ | ○ |
|  | 3-10 | ○ | ○ | ○ | ○ |
|  | 3-11 | ○ | ○ | ○ | ○ |
|  | 3-12 | ○ | ○ | ○ | ○ |
|  | 3-13 | ○ | ○ | ○ | ○ |
|  | 3-14 | ○ | ○ | ○ | ○ |
|  | 3-15 | ○ | ○ | ○ | ○ |
|  | 3-16 | ○ | ○ | ○ | ○ |
|  | 3-17 | ○ | ○ | ○ | ○ |
|  | 3-18 | ○ | ○ | ○ | ○ |
| Comparative Example | 3-1 | ○ | X | X | X |
|  | 3-2 | ○ | X | X | X |
|  | 3-3 | ○ | ○ | ○ | Δ |

As can be seen in Table 3, in the present Examples, the results completely similar to those in the Example 1 above were obtained. The temperature condition of 65° C. is close to the temperature at which the magnetic tape cartridge is actually used, and the effectiveness of the present invention can be confirmed even under the conditions at 65° C./10% RH, namely, at a high temperature and a low humidity.

Example 4

The magnetic head in Example 1 was constituted by the GMR element described with reference to FIG. 14, and the examination was conducted in an operating environment under conditions of temperature and humidity at 65° C./10% RH. The conditions for examination below (Examples 4-1 to 4-18 and Comparative Examples 4-1 to 4-3) correspond to those in the above Examples 1-1 to 1-18 and Comparative Examples 1-1 to 1-3, respectively. The results of the evaluations are shown in Table 4.

TABLE 4

| | GMR head (65° C./10% RH) | | | |
|---|---|---|---|---|
| | Number of loops | | | |
| Example | Up to 100 loops | Up to 200 loops | Up to 500 loops | Up to 1,000 loops |
| Example 4-1 | ○ | ○ | ○ | ○ |
| 4-2 | ○ | ○ | ○ | ○ |
| 4-3 | ○ | ○ | ○ | ○ |
| 4-4 | ○ | ○ | ○ | ○ |
| 4-5 | ○ | ○ | ○ | ○ |
| 4-6 | ○ | ○ | ○ | ○ |
| 4-7 | ○ | ○ | ○ | ○ |
| 4-8 | ○ | ○ | ○ | ○ |
| 4-9 | ○ | ○ | ○ | ○ |
| 4-10 | ○ | ○ | ○ | ○ |
| 4-11 | ○ | ○ | ○ | ○ |
| 4-12 | ○ | ○ | ○ | ○ |
| 4-13 | ○ | ○ | ○ | ○ |
| 4-14 | ○ | ○ | ○ | ○ |
| 4-15 | ○ | ○ | ○ | ○ |
| 4-16 | ○ | ○ | ○ | ○ |
| 4-17 | ○ | ○ | ○ | ○ |
| 4-18 | ○ | ○ | ○ | ○ |
| Comparative 4-1 | Δ | X | X | X |
| Example 4-2 | X | X | X | X |
| 4-3 | ○ | Δ | Δ | Δ |

As can be seen in Table 4, in the present Examples, the results substantially similar to those in the Example 2 above were obtained. The result of Comparative Example 2-1 is "X", whereas the result of Comparative Example 4-1 is "Δ", and the reason for this is presumed to reside in a difference in the conditions for examination of temperature and humidity between 5° C./10% RH (Comparative Example 2-1) and 65° C./10% RH (Comparative Example 4-1). Specifically, taking into consideration the fact that the absolute humidity is likely to be high as the temperature rises even when the relative humidity is fixed, it is presumed that the conditions for examination in Comparative Example 4-1, which are at a high humidity, as compared to those in Comparative Example 2-1, suppress electrostatic discharge, although that is at an unsatisfactory level.

From the results of the Examples 1 to 4 above, there can be obtained findings that, for avoiding electrostatic discharge damage of the magnetic head, it is necessary that the surface resistivity [Ω/sq] of each of the magnetic surface 6M and the back surface 6B of the magnetic tape 6 be in the order of $10^7$ or less. In the following Examples 5 to 12, a magnetic tape having the below-described construction was prepared, and examinations for evaluation of the antistatic effect for the magnetic tape in the construction corresponding to the above second to forth embodiments were conducted.

Example 5

On one surface of a polyethylene terephthalate (PET) film having a thickness of 6.5 μm, a 0.1 μm metallic aluminum film was formed by a vacuum deposition method, and a magnetic film having the formulation shown below was formed on the metallic aluminum film so as to have a thickness of 0.2 μm. On another surface of the PET film, as a back coat layer, a carbon black film included mainly of KETJENBLACK (trade name), manufactured and sold by Eastman Chemical Company, was formed so as to have a thickness of 0.7 μm. Thus, there was prepared a magnetic tape having a thickness of 7.5 μm, in which the surface resistivity of the magnetic surface was 10E6 Ω/sq, and the surface resistivity of the back surface was 10E7 Ω/sq or less (hereinafter, referred to as "magnetic tape having the basic construction").

The formulation of the magnetic layer is as follows.

| <Formulation of the composition for magnetic layer> | |
|---|---|
| Ferromagnetic fine powder (major axis length: 0.15 μm): | 100 Parts by weight |
| Polyester polyurethane resin: (manufactured and sold by TOYOBO CO., LTD.; trade name: UR8200) | 7 Parts by weight |
| Vinyl chloride copolymer: (manufactured and sold by Nippon Zeon Co., Ltd.; trade name: MR110) | 8 Parts by weight |
| Stearic acid: | 1 Part by weight |
| Butyl stearate: | 2 Parts by weight |
| Methyl ethyl ketone: | 20 Parts by weight |
| Toluene: | 20 Parts by weight |
| Cyclohexanone: | 10 Parts by weight |
| Alumina powder: (manufactured and sold by Sumitomo Chemical Co., Ltd.; trade name: AKP50) | 10 Parts by weight |

A mixture having the above formulation of the composition for magnetic layer was kneaded by means of a continuous kneader, and then dispersed using a sand mill. Then, the resultant mixture was subjected to filtration by means of a filter having an average pore size of 1 μm to prepare a composition for magnetic layer. The composition was applied to the metallic aluminum film on the above PET film, and dried and calendered to form a magnetic layer in the present Example.

The magnetic tape having the above basic construction was applied to the magnetic tape 6 of the magnetic tape cartridge C2 in the second and third embodiments, and the cartridge body 53 was constituted by a conductive plastic (manufactured and sold by Mitsubishi Engineering-Plastics Corporation; trade name: "CF2010 antistatic grade"; surface resistivity: about 6×10E6 Ω/sq). Then, the arm member 40 (43) made of a metal or the above conductive plastic was disposed between the inner wall of the cartridge body 53 and the magnetic tape 6, and brought into contact with the magnetic surface 6M or back surface 6B of the magnetic tape 6 at a pressure of about 0.5 to 2.5 g (contact resistance: 10E7 Ω or less) to ground the magnetic tape 6.

The results of the examinations conducted under the conditions for examination shown below (Examples 5-1 to 5-4 and Comparative Examples 5-1 and 5-2) are shown in Table 5. The conditions of temperature and humidity were at 5° C./10% RH, and the recording/reproducing apparatus was the same as the apparatus (using an AMR head as a magnetic head) used in Example 1.

TABLE 5

AMR head (5° C./10% RH)

| Example | Number of loops | | | |
|---|---|---|---|---|
| | Up to 100 loops | Up to 200 loops | Up to 500 loops | Up to 1,000 loops |
| Example 5-1 | ○ | ○ | ○ | ○ |
| 5-2 | ○ | ○ | ○ | ○ |
| 5-3 | ○ | ○ | ○ | ○ |
| 5-4 | ○ | ○ | ○ | ○ |
| Comparative Example 5-1 | X | X | X | X |
| Comparative Example 5-2 | X | X | X | X |

Example 5-1

The arm member 40 was formed from an aluminum alloy, and the edge 42 of the arm member 40 was brought into contact with the magnetic surface 6M of the magnetic tape 6 in the mode shown in FIG. 7. The results of the examinations can confirm that the magnetic tape 6 is prevented from being charged so that the magnetic head suffers no damage.

Example 5-2

The arm member 43 was formed from an aluminum alloy, and the edge 43a of the arm member 43 was brought into contact with the back surface 6B of the magnetic tape 6 in the mode shown in FIG. 10. The results of the examinations can confirm that the magnetic tape 6 is prevented from being charged so that the magnetic head suffers no damage.

Example 5-3

The arm member 40 was formed from the above conductive plastic, and the edge 42 of the arm member 40 was brought into contact with the magnetic surface 6M of the magnetic tape 6 in the mode shown in FIG. 7. The results of the examinations can confirm that the magnetic tape 6 is prevented from being charged so that the magnetic head suffers no damage.

Example 5-4

The arm member 43 was formed from the above conductive plastic, and the edge 43a of the arm member 43 was brought into contact with the back surface 6B of the magnetic tape 6 in the mode shown in FIG. 10. The results of the examinations can confirm that the magnetic tape 6 is prevented from being charged so that the magnetic head suffers no damage.

Comparative Example 5-1

The arm member was formed from a polycarbonate resin having no conductivity (in the present example, S2000, manufactured and sold by Mitsubishi Engineering-Plastics Corporation; surface resistivity: $10^{15}$ Ω/sq or more), and the edge of the arm member was brought into contact with the magnetic surface 6M of the magnetic tape 6 in the mode shown in FIG. 7.

Comparative Example 5-2

The arm member was formed from the above polycarbonate resin having no conductivity, and the edge of the arm member was brought into contact with the back surface 6B of the magnetic tape 6 in the mode shown in FIG. 10.

From Table 5, it is found that deterioration or electrostatic discharge damage of the magnetic head is prevented as long as the arm member has conductivity. In this case, the contact surface of the magnetic tape 6 to the arm member 40 or 43 may be any of the magnetic surface 6M side and the back surface 6B side, and the material for the arm members 40, 43 may be any of a metal and a conductive plastic.

Example 6

The magnetic head in Example 5 was constituted by the GMR element described with reference to FIG. 14 and the examination was conducted. The conditions for examination (Examples 6-1 to 6-4 and Comparative Examples 6-1 and 6-2) correspond to those in the above Examples 5-1 to 5-4 and Comparative Examples 5-1 and 5-2, respectively. The results of the examinations are shown in Table 6.

TABLE 6

GMR head (5° C./10% RH)

| Example | Number of loops | | | |
|---|---|---|---|---|
| | Up to 100 loops | Up to 200 loops | Up to 500 loops | Up to 1,000 loops |
| Example 6-1 | ○ | ○ | ○ | ○ |
| 6-2 | ○ | ○ | ○ | ○ |
| 6-3 | ○ | ○ | ○ | ○ |
| 6-4 | ○ | ○ | ○ | ○ |
| Comparative Example 6-1 | X | X | X | X |
| Comparative Example 6-2 | X | X | X | X |

From Table 6, it is found that the results similar to those in the Example 5 above are obtained. That is, even when the GMR element which is very sensitive to static charge is used in the magnetic head, the effectiveness of the present invention can be confirmed.

Example 7

The examination in Example 5 was conducted in an operating environment under conditions of temperature and humidity at 65° C./10% RH. The conditions for examination (Examples 7-1 to 7-4 and Comparative Examples 7-1 and 7-2) correspond to those in the above Examples 5-1 to 5-4 and Comparative Examples 5-1 and 5-2, respectively. The results of the examinations are shown in Table 7.

TABLE 7

AMR head (65° C./10% RH)

| Example | Number of loops | | | |
|---|---|---|---|---|
| | Up to 100 loops | Up to 200 loops | Up to 500 loops | Up to 1,000 loops |
| Example 7-1 | ○ | ○ | ○ | ○ |
| 7-2 | ○ | ○ | ○ | ○ |
| 7-3 | ○ | ○ | ○ | ○ |
| 7-4 | ○ | ○ | ○ | ○ |

TABLE 7-continued

AMR head (65° C./10% RH)

| | Number of loops | | | |
|---|---|---|---|---|
| Example | Up to 100 loops | Up to 200 loops | Up to 500 loops | Up to 1,000 loops |
| Comparative Example 7-1 | X | X | X | X |
| Comparative Example 7-2 | X | X | X | X |

Example 8

The magnetic head in Example 5 was constituted by the GMR element described with reference to FIG. 14, and the examination was conducted in an operating environment under conditions of temperature and humidity at 65° C./10% RH. The conditions for examination (Examples 8-1 to 8-4 and Comparative Examples 8-1 and 8-2) correspond to those in the above Examples 5-1 to 5-4 and Comparative Examples 5-1 and 5-2, respectively. The results of the examinations are shown in Table 8.

TABLE 8

GMR head (65° C./10%)

| | Number of loops | | | |
|---|---|---|---|---|
| Example | Up to 100 loops | Up to 200 loops | Up to 500 loops | Up to 1,000 loops |
| Example 8-1 | ○ | ○ | ○ | ○ |
| 8-2 | ○ | ○ | ○ | ○ |
| 8-3 | ○ | ○ | ○ | ○ |
| 8-4 | ○ | ○ | ○ | ○ |
| Comparative Example 8-1 | X | X | X | X |
| Comparative Example 8-2 | X | X | X | X |

Example 9

Like the above forth embodiment (FIG. 12), among the plurality of guide rollers 47a to 47f used in the tape traveling system of the recording/reproducing apparatus D, the guide roller 47c, 47d disposed immediately behind and/or immediately ahead of the magnetic head 46 was grounded. The magnetic tape having the above basic construction was applied to the magnetic tape 6 in the magnetic tape cartridge C4 to confirm the antistatic effect for the magnetic tape 6. The conditions of temperature and humidity were at 5° C./10% RH, and the recording/reproducing apparatus was the same as the apparatus (using an AMR head as a magnetic head) used in Example 1. The results of the examinations conducted under the conditions for examination shown below (Examples 9-1 to 9-6 and Comparative Example 9) are shown in Table 9.

TABLE 9

AMR head (5° C./10% RH)

| | Number of loops | | | |
|---|---|---|---|---|
| Example | Up to 100 loops | Up to 200 loops | Up to 500 loops | Up to 1,000 loops |
| Example 9-1 | ○ | ○ | ○ | ○ |
| 9-2 | ○ | ○ | ○ | ○ |
| 9-3 | ○ | ○ | ○ | ○ |
| 9-4 | ○ | ○ | ○ | ○ |
| 9-5 | ○ | ○ | ○ | ○ |
| 9-6 | ○ | ○ | ○ | ○ |
| Comparative Example 9 | ○ | ○ | Δ | X |

Example 9-1

The guide rollers 47c, 47d immediately behind and immediately ahead of the magnetic head 46 (as viewed in the traveling direction of the tape; this applies to the following) were grounded, and the magnetic tape was allowed to travel so that the magnetic surface 6M of the magnetic tape 6 was in contact with the guide rollers 47c, 47d as shown in FIG. 13A. The results of the examinations can confirm that the magnetic tape 6 is prevented from being charged so that the magnetic head suffers no damage.

Example 9-2

Only the guide roller 47c immediately behind the magnetic head 46 in Example 9-1 was grounded. The results of the examinations can confirm that the magnetic tape 6 is prevented from being charged so that the magnetic head suffers no damage.

Example 9-3

Only the guide roller 47d immediately ahead of the magnetic head 46 in Example 9-1 was grounded. The results of the examinations can confirm that the magnetic tape 6 is prevented from being charged so that the magnetic head suffers no damage.

Example 9-4

The guide rollers 47c, 47d immediately behind and immediately ahead of the magnetic head 46 were grounded, and the magnetic tape was allowed to travel so that the back surface 6B of the magnetic tape 6 was in contact with the guide rollers 47c, 47d as shown in FIG. 12. The results of the examinations can confirm that the magnetic tape 6 is prevented from being charged so that the magnetic head suffers no damage.

Example 9-5

Only the guide roller 47c immediately behind the magnetic head 46 in Example 9-4 was grounded. The results of the examinations can confirm that the magnetic tape 6 is prevented from being charged so that the magnetic head suffers no damage.

Example 9-6

Only the guide roller 47d immediately ahead of the magnetic head 46 in Example 9-4 was grounded. The results of the examinations can confirm that the magnetic tape 6 is prevented from being charged so that the magnetic head suffers no damage.

Comparative Example 9

The guide rollers immediately behind and immediately ahead of the magnetic head were not grounded, and the magnetic tape was allowed to travel so that the magnetic surface of the magnetic tape was in contact with the guide rollers (the guide rollers 47c, 47d in Example 9-1 were not grounded).

From Table 9, the effectiveness of the present invention can be confirmed, irrespective of whether the guide roller to be grounded is disposed immediately behind or immediately ahead of the magnetic head, or whether the contact surface of the magnetic tape is the magnetic surface or the back surface.

Example 10

The magnetic head in Example 9 was constituted by the GMR element described with reference to FIG. 14 and the examination was conducted. The conditions for examination Examples 10-1 to 10-6 and Comparative Example 10) correspond to those in the above Examples 9-1 to 9-6 and Comparative Example 9, respectively. The results of the examinations are shown in Table 10.

TABLE 10

GMR head (5° C./10% RH)

| Example | Number of loops | | | |
|---|---|---|---|---|
| | Up to 100 loops | Up to 200 loops | Up to 500 loops | Up to 1,000 loops |
| Example 10-1 | ○ | ○ | ○ | ○ |
| 10-2 | ○ | ○ | ○ | ○ |
| 10-3 | ○ | ○ | ○ | ○ |
| 10-4 | ○ | ○ | ○ | ○ |
| 10-5 | ○ | ○ | ○ | ○ |
| 10-6 | ○ | ○ | ○ | ○ |
| Comparative Example 10 | X | X | X | X |

From Table 10, it is found that the results similar to those in the Example 9 above are obtained. That is, even when the GMR element which is very sensitive to static charge is used in the magnetic head, the effectiveness of the present invention can be confirmed.

Example 11

The examination in Example 9 was conducted in an operating environment under conditions of temperature and humidity at 65° C./10% RH. The conditions for examination (Examples 11-1 to 11-6 and Comparative Example 11) correspond to those in the above Examples 9-1 to 9-6 and Comparative Example 9, respectively. The results of the examinations are shown in Table 11.

TABLE 11

AMR head (65° C./10% RH)

| Example | Number of loops | | | |
|---|---|---|---|---|
| | Up to 100 loops | Up to 200 loops | Up to 500 loops | Up to 1,000 loops |
| Example 11-1 | ○ | ○ | ○ | ○ |
| 11-2 | ○ | ○ | ○ | ○ |
| 11-3 | ○ | ○ | ○ | ○ |
| 11-4 | ○ | ○ | ○ | ○ |
| 11-5 | ○ | ○ | ○ | ○ |
| 11-6 | ○ | ○ | ○ | ○ |
| Comparative Example 11 | ○ | ○ | Δ | X |

Example 12

The magnetic head in Example 9 was constituted by the GMR element described with reference to FIG. 14, and the examination was conducted in an operating environment under conditions of temperature and humidity at 65° C./10% RH. The conditions for examination (Examples 12-1 to 12-6 and Comparative Example 12) correspond to those in the above Examples 9-1 to 9-6 and Comparative Example 9, respectively. The results of the examinations are shown in Table 12.

TABLE 12

GMR head (65° C./10% RH)

| Example | Number of loops | | | |
|---|---|---|---|---|
| | Up to 100 loops | Up to 200 loops | Up to 500 loops | Up to 1,000 loops |
| Example 12-1 | ○ | ○ | ○ | ○ |
| 12-2 | ○ | ○ | ○ | ○ |
| 12-3 | ○ | ○ | ○ | ○ |
| 12-4 | ○ | ○ | ○ | ○ |
| 12-5 | ○ | ○ | ○ | ○ |
| 12-6 | ○ | ○ | ○ | ○ |
| Comparative Example 12 | X | X | X | X |

Hereinabove, the embodiments of the present invention are individually described, but the present invention is not limited to these embodiments, and can be changed or modified based on the technical concept of the present invention.

For example, in the above first embodiment, an explanation is made on the construction in which the tape reel 7 (reel hub 7A) is formed from a conductive material, and electrically connected to the reel drive shaft 33 on the recording/reproducing apparatus side during the tape loading to ground the magnetic tape 6, but, instead of this, a construction may be employed such that the cassette body 3 is constituted by a conductive plastic, and the cassette body 3 is electrically connected to the tape reel 7 through the reel spring 8 made of a metal (see FIG. 6). In this construction, the magnetic tape 6 is grounded during being used not only through the reel drive shaft 33 but also by the sliding action of the cassette body 3 against the grounded cassette compartment on the recording/reproducing apparatus side, thus making it possible to prevent the magnetic head from suffering electrostatic discharge damage.

Figure 15:
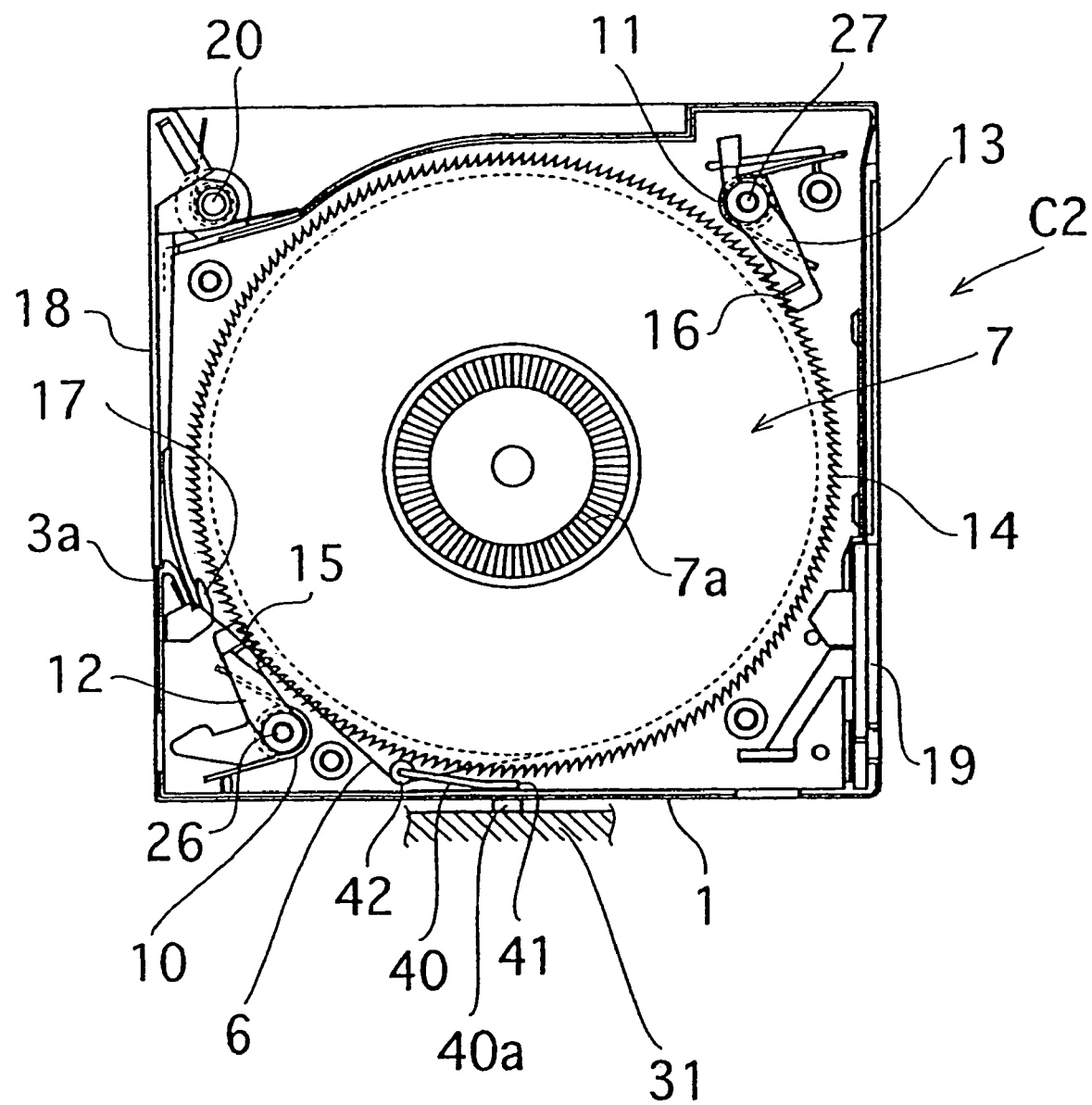
FIG. 15 is a cross-sectional view of an essential portion of a magnetic tape cartridge, showing an example of variation of the second and third embodiments of the present invention.

In addition, in the above second and third embodiments, the cassette body 53 is constituted by a conductive plastic to make an electrical connection between the arm members 40, 43 in contact with the magnetic tape 6 and the cassette compartment 31, but, instead of this, a construction may be employed such that the cassette body 53 is constituted by a general resin (having no conductivity) and, for example, a base portion 40a of the arm member 40 is disposed out of the cassette as shown in FIG. 15 so as to be directly in contact with the cassette compartment 31. The similar construction can be applied to the arm member 43.

Alternatively, the present invention can be applied to a construction such that the electrical connection between the conductive cartridge body 53 and the magnetic tape 6 or the conductive tape reel is made by providing, for example, a conductive member, such as metallic wire or metallic brush, on the inner wall of the cartridge or at the opening portion 34 for drawing the tape.

Further, in the above forth embodiment, among the plurality of guide rollers 47a to 47f constituting the tape traveling system of the recording/reproducing apparatus D, the guide roller 47c and/or guide roller 47d adjacent to the magnetic head is grounded, but the construction is not limited to this, and, in addition to the guide rollers 47c, 47d, or instead of the guide rollers 47c, 47d, another guide roller may be grounded.

Further, in the above embodiments, an explanation is made taking the single reel type magnetic tape cartridge as an example, but the magnetic tape cartridge is not limited to this type, and the present invention can be applied to an LTO single reel type magnetic tape cartridge and a multi-reel type magnetic tape cartridge for DAT or 8 mm tape.

INDUSTRIAL APPLICABILITY

In the magnetic tape cartridge of the present invention, the reel hub is formed from a conductive material and one end portion of the magnetic tape connected to the reel hub has a surface resistivity [$\Omega$/sq] in the order of $10^7$ or less. Therefore, charges on the magnetic tape are drained through the reel hub toward, for example, the recording/reproducing apparatus side, thus making it possible to prevent the magnetic head from suffering damage due to electrostatic discharge.

In addition, in the magnetic tape cartridge of the present invention wherein the cartridge body is formed from a conductive material, and the magnetic tape has surfaces individually having a surface resistivity [$\Omega$/sq] in the order of $10^7$ or less and the magnetic tape is electrically connected to the cartridge body, charges on the magnetic tape are drained through the cartridge body toward, for example, the recording/reproducing apparatus side, thus making it possible to prevent the magnetic head from suffering damage due to electrostatic discharge.

Further, in the apparatus for recording/reproducing a magnetic tape cartridge of the present invention, which apparatus includes at least a magnetic head for recording information on a magnetic tape or reproducing information recorded on the magnetic tape, and a plurality of guide rollers for guiding the traveling magnetic tape, at least one of the guide rollers is electrically grounded, and the traveling surface of the magnetic tape in contact with the grounded guide roller has a surface resistivity [$\Omega$/sq] in the order of $10^7$ or less. Therefore, charges on the magnetic tape are drained through the grounded guide roller toward, for example, the recording/reproducing apparatus side, thus making it possible to prevent the magnetic head from suffering damage due to electrostatic discharge.

Furthermore, in each of the above constructions, when the magnetic tape includes a nonmagnetic conductor layer constituted by a nonmagnetic conductive material disposed between a plastic film and a magnetic layer, the resistance of the magnetic tape can be lowered while maintaining optimum electromagnetic conversion properties of the magnetic layer in the magnetic tape.

The invention claimed is:

1. A magnetic tape cartridge comprising a reel hub having a magnetic tape wound there around, and a cartridge body for rotatably housing said reel hub, the magnetic tape cartridge characterized in that:
    said reel hub is formed by a conductive material;
    an end portion of said magnetic tape connected to said reel hub has a surface resistivity [$\Omega$/sq] in the order of $10^7$ or less; and
    said magnetic tape comprises a nonmagnetic conductor layer including a nonmagnetic conductive material disposed between a plastic film and a magnetic layer;
    wherein said end portion has said magnetic layer removed to expose the nonmagnetic conductor layer that is positioned in direct contact with said reel hub and makes electrical contact therewith; and
    said magnetic tape is connected to an external ground circuit including a reel drained axis electrically grounded via said reel hub.

2. A magnetic tape cartridge comprising a reel hub having a magnetic tape wound there around, and a cartridge body for rotatably housing said reel hub, the magnetic tape cartridge characterized in that:
    said reel hub is formed by a conductive material;
    an end portion of said magnetic tape connected to said reel hub has a surface resistivity [$\Omega$/sq] in the order of $10^7$ or less;
    said magnetic tape has a back coat layer comprising a nonmagnetic conductive material on a surface on an opposite side of a magnetic surface of said magnetic tape;
    said end portion having said nonmagnetic conductive material of the back coat layer positioned in direct contact with said reel hub and makes electrical contact therewith; and
    said magnetic tape is connected to an external ground circuit including a reel drained axis electrically grounded via said reel hub.

3. A magnetic tape cartridge comprising a reel hub having a magnetic tape wound there around, and a cartridge body for rotatably housing said reel hub, the magnetic tape cartridge characterized in that:
    said cartridge body is formed by a conductive material;
    surfaces of said magnetic tape have each a surface resistivity [$\Omega$/sq] in the order of $10^7$ or less;
    said magnetic tape includes an electrically-conductive layer disposed between a plastic film and a magnetic layer, an end portion of the magnetic tape has the magnetic layer removed to expose the electrically-conductive layer that is positioned in direct contact with said reel hub and makes electrical contact therewith;
    said cartridge body has provided therein an arm member comprising a conductive material, wherein an end of said arm member is fixed to said cartridge body and another end is in contact with said magnetic tape; and
    said other end elastically contacts said magnetic tape.

4. The magnetic tape cartridge according to claim 3, characterized in that said arm member is in contact with a magnetic surface of said magnetic tape.

5. The magnetic tape cartridge according to claim 3, characterized by having a back coat layer comprising a nonmagnetic conductive material on a surface on an opposite side of a magnetic surface of said magnetic tape; and
said arm member is in contact said surface on the opposite side of said magnetic surface.

6. A magnetic tape cartridge recording/reproducing apparatus comprising a reel hub having a magnetic tape wound there around, and a cartridge body for rotatably housing said reel hub, the magnetic tape cartridge recording/reproducing apparatus characterized by:
at least a magnetic head for recording information on said magnetic tape or reproducing information recorded on said magnetic tape, and a plurality of guide rollers for guiding said traveling magnetic tape;
wherein at least one of said guide rollers disposed immediately in front of and after said magnetic head is electrically grounded;
a traveling surface of said magnetic tape in contact with said grounded guide roller has a surface resistivity [$\Omega$/sq] in the order of $10^7$ or less;
said magnetic tape comprises a nonmagnetic conductor layer including a nonmagnetic conductive material disposed between a plastic film and a magnetic layer; and
said traveling surface of said magnetic tape comprises said magnetic surface,
wherein an end portion of the magnetic tape has the magnetic layer removed to expose the nonmagnetic conductor layer that is positioned in direct contact with the reel hub and makes electrical contact therewith.

7. A magnetic tape cartridge recording/reproducing apparatus comprising a reel hub having a magnetic tape wound there around, and a cartridge body for rotatably housing said reel hub, the magnetic tape cartridge recording/reproducing apparatus characterized by:
at least a magnetic head for recording information on said magnetic tape or reproducing information recorded on said magnetic tape, and a plurality of guide rollers for guiding said traveling magnetic tape;
wherein at least one of said guide rollers disposed immediately in front of and after said magnetic heard is electrically grounded;
a traveling surface of said magnetic tape in contact with said grounded guide roller has a surface resistivity [$\Omega$/sq] in the order of $10^7$ or less;
said magnetic tape comprises a nonmagnetic conductor layer including a nonmagnetic conductive material disposed between a plastic film and a magnetic layer;
wherein an end portion of the magnetic tape has the magnetic layer removed to expose the nonmagnetic conductor layer that is positioned in direct contact with the reel hub and makes electrical contact therewith; and
said traveling surface of said magnetic tape comprises said surface on the opposite side of said magnetic surface.

8. The magnetic tape cartridge recording/reproducing apparatus according to claim 6, characterized in that said magnetic head comprises a magnetoresistive magnetic head.

9. The magnetic tape cartridge recording/reproducing apparatus according to claim 7, characterized in that said magnetic head comprises a magnetoresistive magnetic head.

10. The magnetic tape cartridge recording/reproducing apparatus according to claim 6, characterized in that said grounded guide roller comprises at least a pair of guide rollers having said magnetic head disposed therebetween.

11. The magnetic tape cartridge recording/reproducing apparatus according to claim 7, characterized in that said grounded guide roller comprises at least a pair of guide rollers having said magnetic head disposed therebetween.

12. A magnetic tape cartridge comprising:
a reel hub at least partially formed of a conductive material and rotatably coupled to a cartridge body; and
magnetic tape disposed around the reel hub, the magnetic tape having a layer of an electrically-conductive nonmagnetic material disposed between a plastic film and a magnetic layer;
wherein an end portion of the magnetic tape has the magnetic layer removed to expose the electrically-conductive nonmagnetic material that is positioned in direct contact with the reel hub and makes electrical contact therewith.

* * * * *